(12) United States Patent
Xiao et al.

(10) Patent No.: US 12,683,850 B2
(45) Date of Patent: Jul. 14, 2026

(54) PROBABILISTIC CONSTELLATION SHAPING SCHEMES FOR MULTIPLE LAYER TRANSMISSIONS

(71) Applicant: QUALCOMM Incorporated, San Diego, CA (US)

(72) Inventors: Kexin Xiao, Shanghai (CN); Liangming Wu, Beijing (CN); Hung Dinh Ly, San Diego, CA (US); Yi Huang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 18/848,483

(22) PCT Filed: May 12, 2022

(86) PCT No.: PCT/CN2022/092383
§ 371 (c)(1),
(2) Date: Sep. 18, 2024

(87) PCT Pub. No.: WO2023/216177
PCT Pub. Date: Nov. 16, 2023

(65) Prior Publication Data
US 2025/0202756 A1 Jun. 19, 2025

(51) Int. Cl.
*H04L 27/34* (2006.01)
*H04L 1/00* (2006.01)
*H04L 27/36* (2006.01)

(52) U.S. Cl.
CPC ........ *H04L 27/3483* (2013.01); *H04L 1/0042* (2013.01); *H04L 27/366* (2013.01)

(58) Field of Classification Search
CPC .. H04L 27/3483; H04L 1/0042; H04L 27/366
See application file for complete search history.

(56) References Cited

U.S. PATENT DOCUMENTS 10,608,749 B1 * 3/2020 Morero .................. H03M 7/14
2018/0083716 A1 3/2018 Cho et al.
(Continued)

FOREIGN PATENT DOCUMENTS

CN 101447854 A 6/2009
CN 110959262 A 4/2020
CN 113067665 A 7/2021

OTHER PUBLICATIONS

International Search Report and Written Opinion—PCT/CN2022/092383—ISA/EPO—Nov. 1, 2022.
(Continued)

*Primary Examiner* — Freshteh N Aghdam
(74) *Attorney, Agent, or Firm* — QUALCOMM Incorporated

(57) ABSTRACT

Certain aspects of the present disclosure provide techniques for a probabilistic constellation shaping (PCS) scheme for multiple layer transmissions. An example method includes obtaining a configuration for performing a PCS modulation scheme, identifying a set of bits corresponding to a transport block for communication via the multi-layer transmission, performing distribution matching on the set of bits using a set of parameters indicated in the configuration to obtain a set of distributed symbols, converting the set of distributed symbols into a set of distributed bits, encoding the set of distributed bits to obtain an encoded set of distributed bits, performing a modulation procedure on the encoded set of distributed bits in accordance with the PCS modulation scheme to obtain a set of modulation symbols corresponding to a codeword associated with the transport block, and transmitting, to a receiving device, the codeword, including the set of modulation symbols, via the multi-layer transmission.

28 Claims, 12 Drawing Sheets

(56)         References Cited

U.S. PATENT DOCUMENTS

| | | | | |
|---|---|---|---|---|
| 2019/0052509 A1* | 2/2019 | Krishnan | .............. | H04L 1/0043 |
| 2020/0021391 A1* | 1/2020 | Rico Alvarino | ...... | H04L 1/0004 |
| 2020/0287756 A1 | 9/2020 | Razzetti et al. | | |
| 2021/0084654 A1 | 3/2021 | Yang et al. | | |
| 2022/0006532 A1* | 1/2022 | Elzanaty | .............. | H04B 10/503 |
| 2022/0416935 A1* | 12/2022 | Kim | ....................... | H04L 27/362 |
| 2023/0353282 A1* | 11/2023 | Tao | ........................ | H04L 1/0058 |
| 2023/0361913 A1* | 11/2023 | Wu | ....................... | H04L 1/0075 |

OTHER PUBLICATIONS

Kang W., "A Probabilistic Shaping Scheme for MIMO Systems with Signal Space Diversity", 2022 IEEE Wireless Communications and Networking Conference (WCNC), IEEE, Apr. 10, 2022, pp. 251-255, XP034122841, sections I, II, III, figure 1.
Supplementary European Search Report—EP22941135—Search Authority—Munich—Jan. 5, 2026.

* cited by examiner

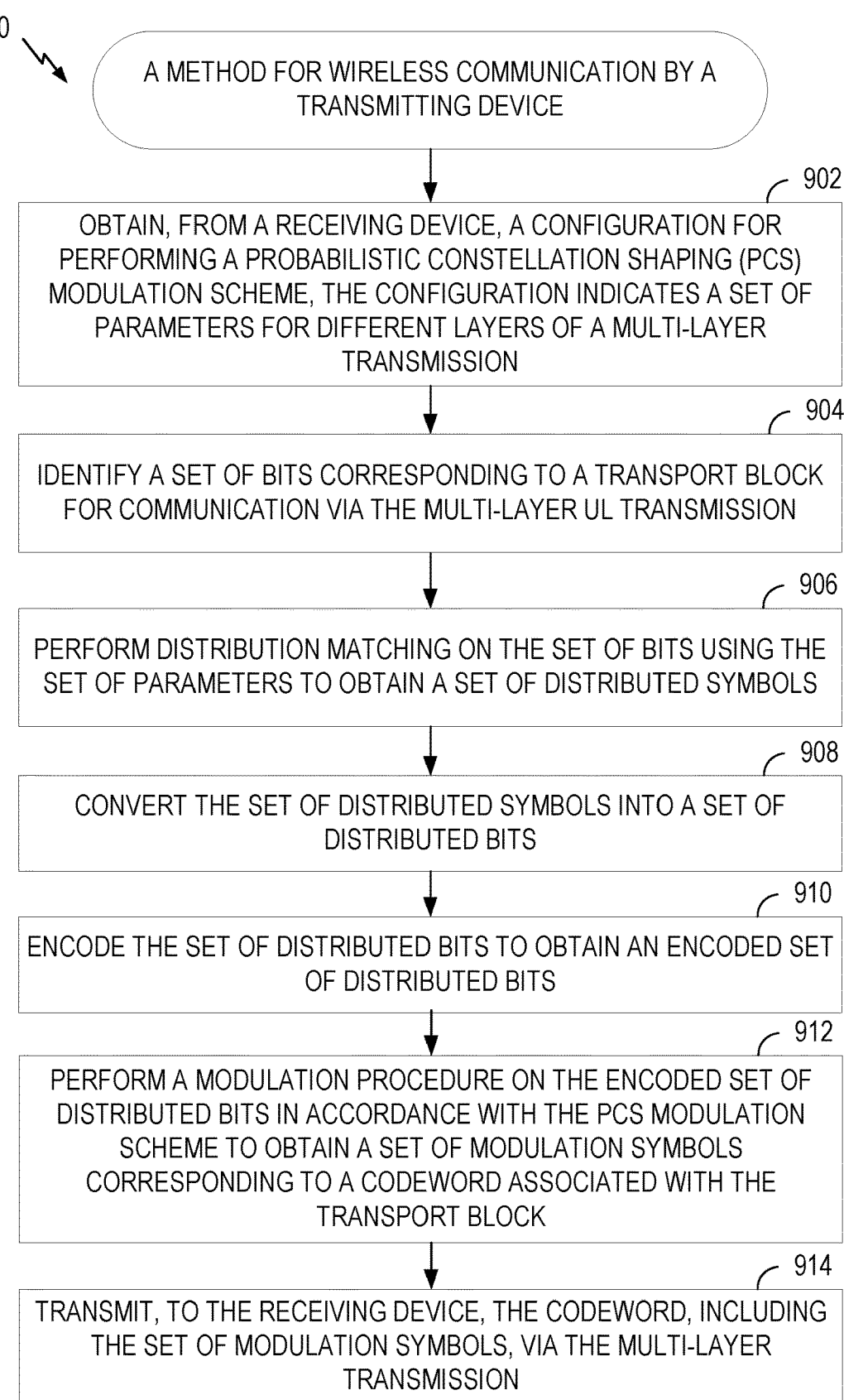

900

A METHOD FOR WIRELESS COMMUNICATION BY A TRANSMITTING DEVICE

902

OBTAIN, FROM A RECEIVING DEVICE, A CONFIGURATION FOR PERFORMING A PROBABILISTIC CONSTELLATION SHAPING (PCS) MODULATION SCHEME, THE CONFIGURATION INDICATES A SET OF PARAMETERS FOR DIFFERENT LAYERS OF A MULTI-LAYER TRANSMISSION

904

IDENTIFY A SET OF BITS CORRESPONDING TO A TRANSPORT BLOCK FOR COMMUNICATION VIA THE MULTI-LAYER UL TRANSMISSION

906

PERFORM DISTRIBUTION MATCHING ON THE SET OF BITS USING THE SET OF PARAMETERS TO OBTAIN A SET OF DISTRIBUTED SYMBOLS

908

CONVERT THE SET OF DISTRIBUTED SYMBOLS INTO A SET OF DISTRIBUTED BITS

910

ENCODE THE SET OF DISTRIBUTED BITS TO OBTAIN AN ENCODED SET OF DISTRIBUTED BITS

912

PERFORM A MODULATION PROCEDURE ON THE ENCODED SET OF DISTRIBUTED BITS IN ACCORDANCE WITH THE PCS MODULATION SCHEME TO OBTAIN A SET OF MODULATION SYMBOLS CORRESPONDING TO A CODEWORD ASSOCIATED WITH THE TRANSPORT BLOCK

914

TRANSMIT, TO THE RECEIVING DEVICE, THE CODEWORD, INCLUDING THE SET OF MODULATION SYMBOLS, VIA THE MULTI-LAYER TRANSMISSION

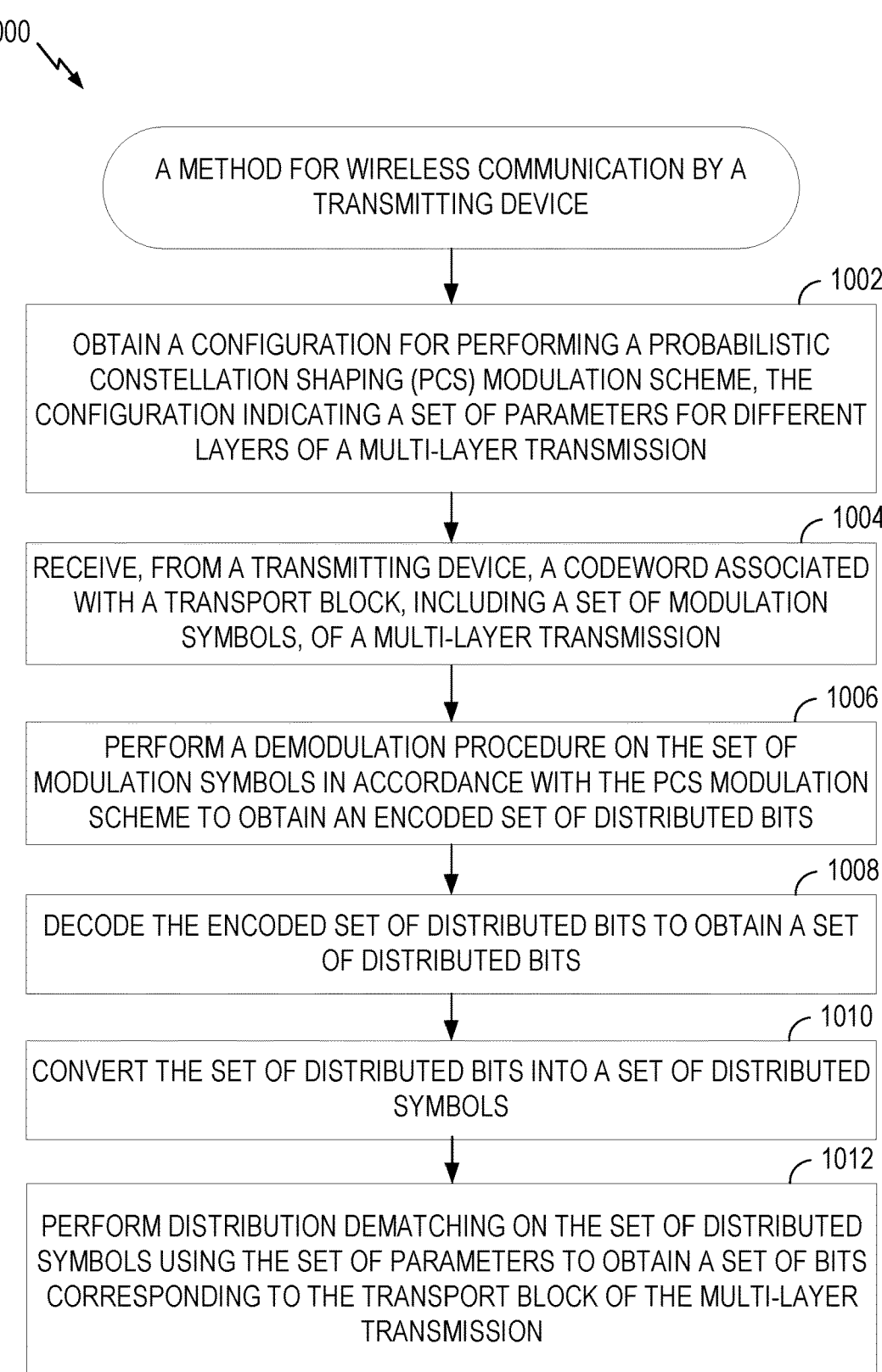

A METHOD FOR WIRELESS COMMUNICATION BY A TRANSMITTING DEVICE

1002

OBTAIN A CONFIGURATION FOR PERFORMING A PROBABILISTIC CONSTELLATION SHAPING (PCS) MODULATION SCHEME, THE CONFIGURATION INDICATING A SET OF PARAMETERS FOR DIFFERENT LAYERS OF A MULTI-LAYER TRANSMISSION

1004

RECEIVE, FROM A TRANSMITTING DEVICE, A CODEWORD ASSOCIATED WITH A TRANSPORT BLOCK, INCLUDING A SET OF MODULATION SYMBOLS, OF A MULTI-LAYER TRANSMISSION

1006

PERFORM A DEMODULATION PROCEDURE ON THE SET OF MODULATION SYMBOLS IN ACCORDANCE WITH THE PCS MODULATION SCHEME TO OBTAIN AN ENCODED SET OF DISTRIBUTED BITS

1008

DECODE THE ENCODED SET OF DISTRIBUTED BITS TO OBTAIN A SET OF DISTRIBUTED BITS

1010

CONVERT THE SET OF DISTRIBUTED BITS INTO A SET OF DISTRIBUTED SYMBOLS

1012

PERFORM DISTRIBUTION DEMATCHING ON THE SET OF DISTRIBUTED SYMBOLS USING THE SET OF PARAMETERS TO OBTAIN A SET OF BITS CORRESPONDING TO THE TRANSPORT BLOCK OF THE MULTI-LAYER TRANSMISSION

FIG. 10

PROBABILISTIC CONSTELLATION SHAPING SCHEMES FOR MULTIPLE LAYER TRANSMISSIONS

CROSS-REFERENCE TO RELATED APPLICATIONS

This application is a national stage application under 35 U.S.C. 371 of PCT/CN2022/092383, filed May 12, 2022, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for a probabilistic constellation shaping scheme for multiple layer transmissions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a transmitting device. The method includes obtaining a configuration for performing a probabilistic constellation shaping (PCS) modulation scheme, the configuration indicating a set of parameters for different layers of a multi-layer transmission, identifying a set of bits corresponding to a transport block for communication via the multi-layer transmission, performing distribution matching on the set of bits using the set of parameters to obtain a set of distributed symbols, converting the set of distributed symbols into a set of distributed bits, encoding the set of distributed bits to obtain an encoded set of distributed bits, performing a modulation procedure on the encoded set of distributed bits in accordance with the PCS modulation scheme to obtain a set of modulation symbols corresponding to a codeword associated with the transport block, and transmitting, to a receiving device, the codeword, including the set of modulation symbols, via the multi-layer transmission Another aspect provides a method for wireless communication by a receiving device. The method includes obtaining a configuration for performing a probabilistic constellation shaping (PCS) modulation scheme, the configuration indicating a set of parameters for different layers of a multi-layer transmission, receiving, from a transmitting device, a codeword associated with a transport block, including a set of modulation symbols, of a multi-layer transmission, performing a demodulation procedure on the set of modulation symbols in accordance with the PCS modulation scheme to obtain an encoded set of distributed bits, decoding the encoded set of distributed bits to obtain a set of distributed bits, converting the set of distributed bits into a set of distributed symbols, and performing distribution dematching on the set of distributed symbols using the set of parameters to obtain a set of bits corresponding to the transport block of the multi-layer transmission.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 9 depicts a method for wireless communications.

FIG. 10 depicts another method for wireless communications.

DETAILED DESCRIPTION

Figure 1:
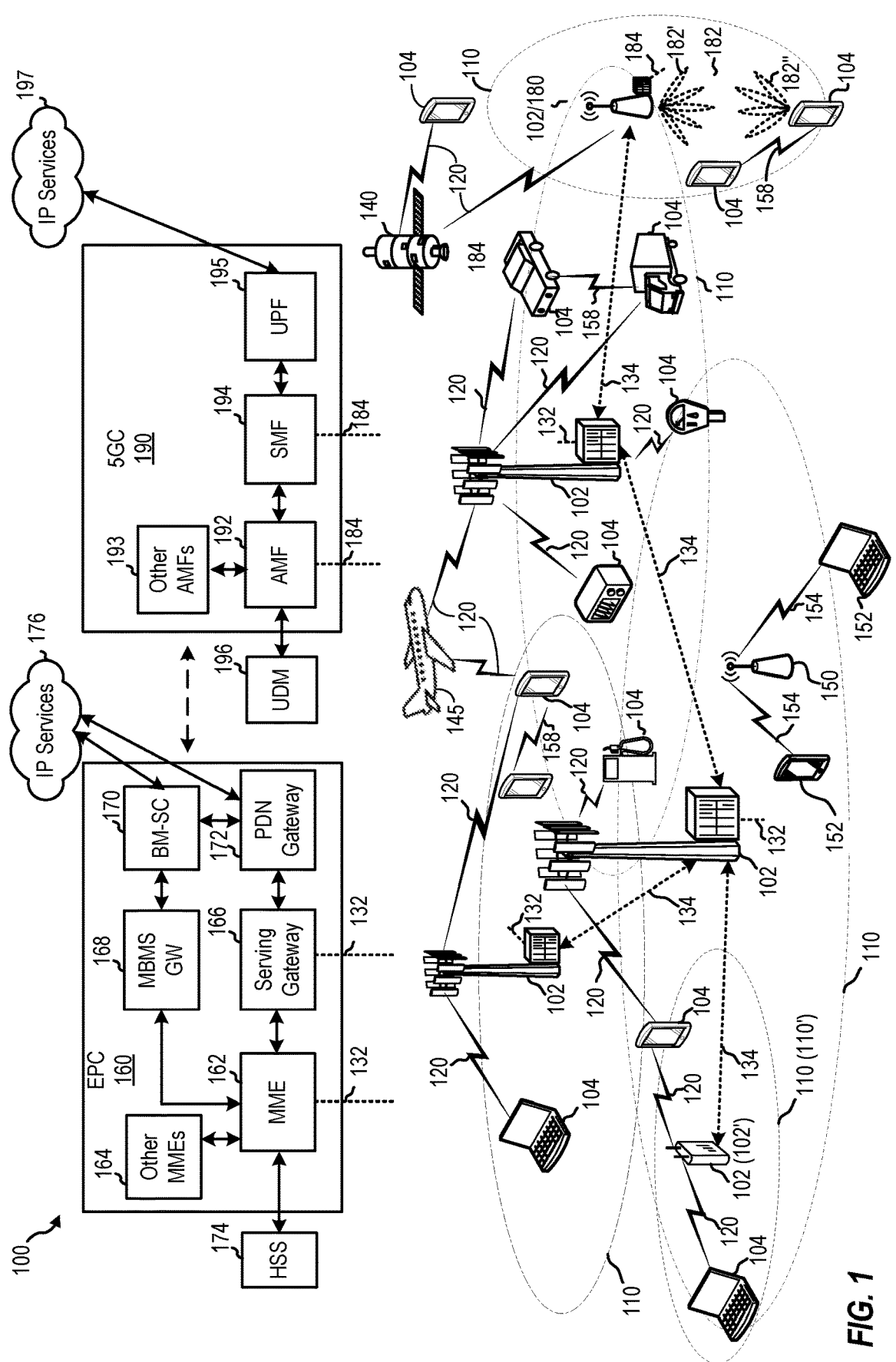
FIG. 1 depicts an example wireless communications network.

Aspects of the present disclosure provide apparatuses, methods, processing systems, and computer-readable mediums for a probabilistic constellation shaping (PCS) scheme for multiple layer transmissions.

PCS may involve a transmitting device mapping bits to modulation symbols such that some modulation symbols of a symbol constellation may be more likely to be mapped to, and thus transmitted over the air to a receiving device, than others. In some cases, this mapping may be based on a non-uniform probability distribution associated with a probability mass function (PMF). To support PCS, the transmitting device may perform distribution matching (DM) on a set of input bits for which constellation mapping (e.g., the selection of corresponding modulation symbols from a symbol constellation) is to be performed.

PCS may improve spectral efficiency and allow communications to more closely approach the Shannon capacity (e.g., a theoretical maximum amount of information or data capacity that can be sent over a channel or medium). Additionally PCS may improve power consumption—for example, modulation symbols with smaller amplitudes may be used more frequently than modulation symbols with larger amplitudes.

While PCS may improve spectral efficiency and improve power consumption, existing techniques for modulating information based on a modulation and coding scheme (MSC) index and MCS table may not be sufficient to support PCS. For example, current MCS tables are designed only for uniform constellations with equal/uniform probability. Additionally, current constellation mappers used in the modulation process may only use uniform constellations with equal/uniform probability distributions.

Moreover, in some cases, the transmitting device may transmit information to the receiving device using multiple transmission layers. For example, in some cases, a single codeword may map to multiple layers each of which use a common MCS (including modulation order) and forward error correction (FEC) encoding rate. In some cases, channel conditions (e.g., an effective signal to noise ratio (SNR)) can vary significantly among the multiple layers used for transmitting this single codeword. These varying channel conditions may be problematic when using PCS as an optimal PMF or probability distribution for PCS may be sensitive to the channel conditions of each layer. In other words, a PMF or probability distribution used for one layer may not be sufficient for use with another layer. Using a PMF or probability distribution that is not sufficient for a particular layer may lead to information transmitted via this particular layer not being received correctly by a receiving device, leading to possible retransmissions of this information and, as a result, wasted time and frequency resources within a wireless network as well as wasted power resources at the transmitting device and receiving device. As such, layer-based DM rate adaption (e.g., involving using different DM rates per layer) may be helpful for link adaption.

Accordingly, aspects of the provide techniques for supporting PCS when using multi-layer transmissions. For example, in some cases, such techniques may involve improved MCS indication to better support PCS for multi-layer transmissions. Additionally, these techniques may involve the use of different DM rates, and thereby PMF/probability distributions, for different layers of a codeword for better link adaption for PCS. In such cases, the techniques presented herein may also involve the configuration and use of different scaling values that may be used during modulation. For example, for given a modulation order, different scaling values may be used for constellation points at a modulation due to different PMF or probability distributions. In some cases, these scaling values may be consistent between the transmitter device and the receiver device for proper demodulation.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
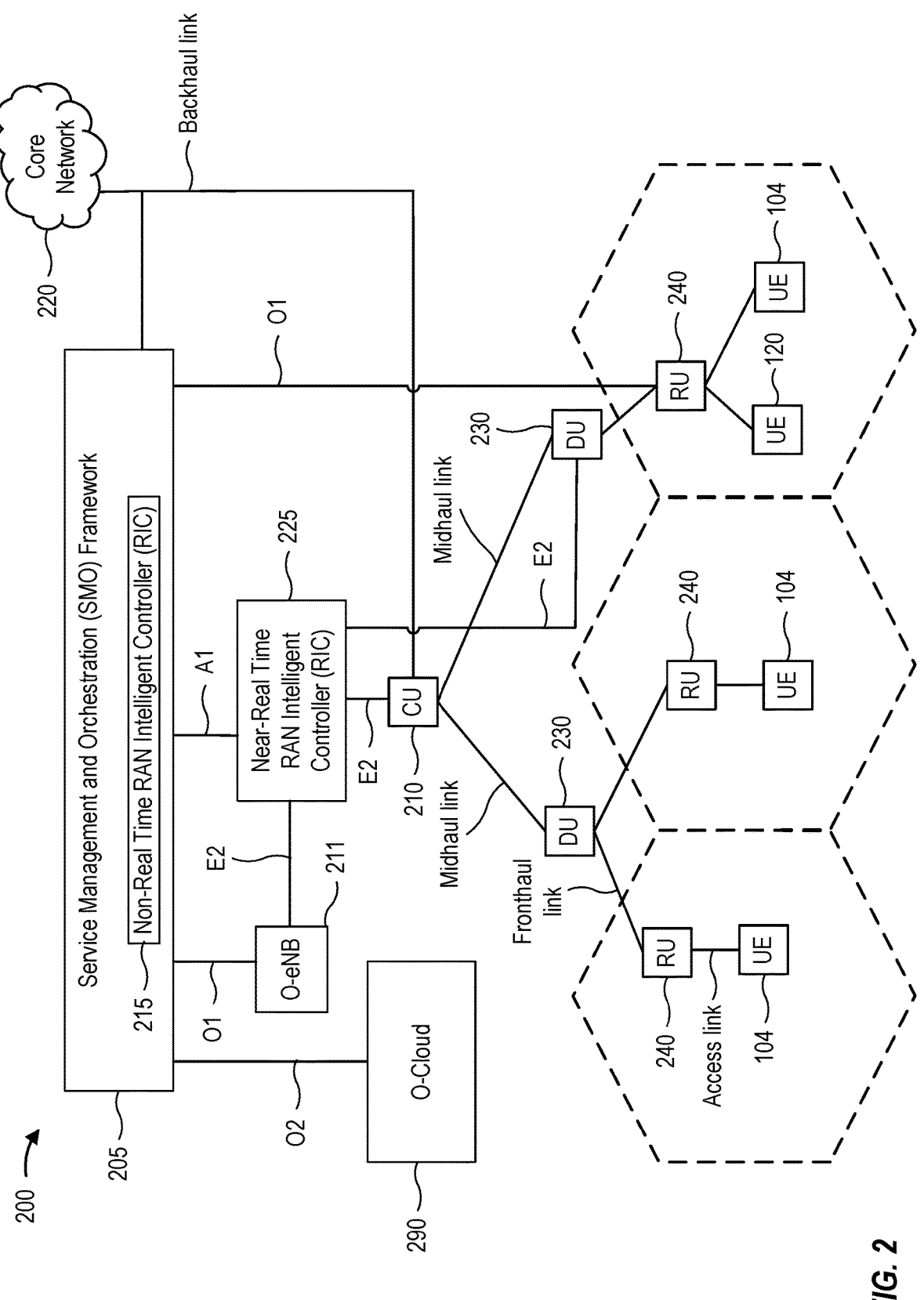
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
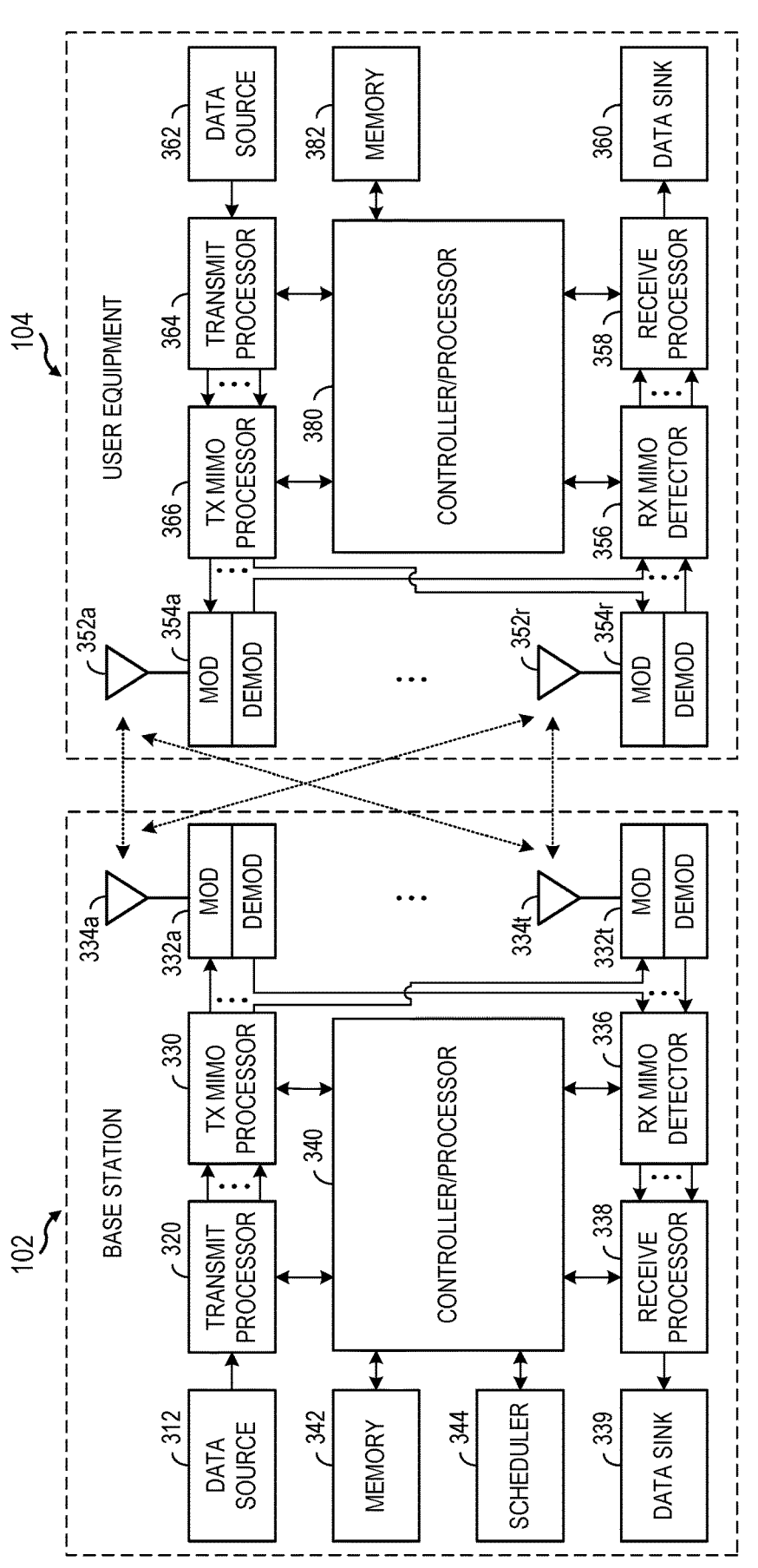
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/ processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
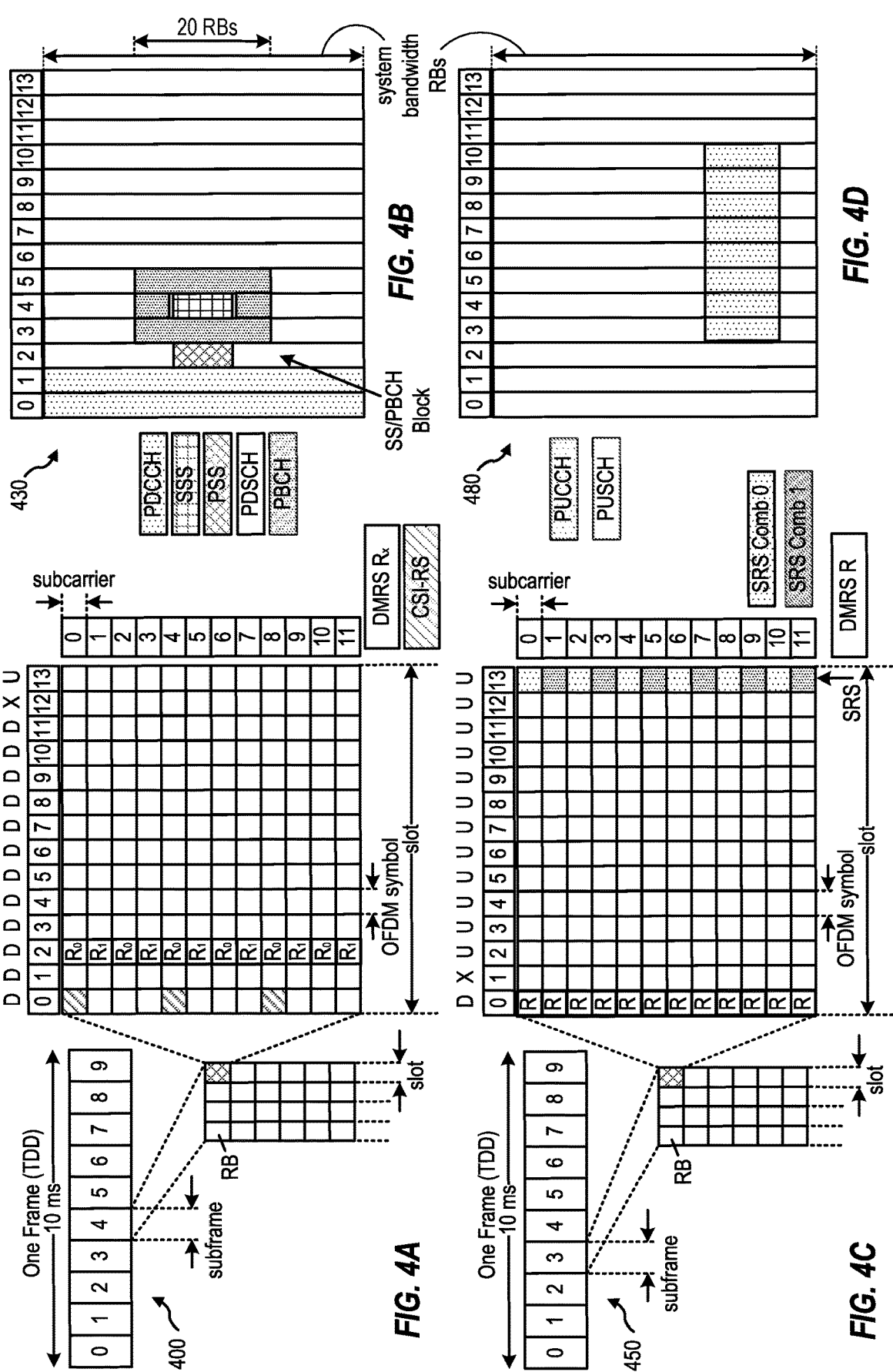
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semistatically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Probabilistic Constellation Shaping

In some wireless communications systems, a transmitting device (e.g., BS 102, UE 104, or any other wireless device described herein capable of transmitting wireless signals) may perform probabilistic constellation shaping (PCS). PCS may involve mapping bits to modulation symbols (e.g., quadrature amplitude modulation (QAM) symbols) such that some modulation symbols of a symbol constellation may be more likely to be mapped to, and thus transmitted over the air, than others. For example, modulation symbols associated with lower amplitudes may be selected with greater likelihood (and thus more often over time or in connection with a given set of bits) than modulation symbols associated with lower amplitudes, which may provide power savings, improved spectral efficiency, or other benefits.

To support PCS, the transmitting device may perform distribution matching on a set of bits for which constellation mapping (e.g., the selection of corresponding modulation symbols from a symbol constellation) is to be performed. It may be assumed that, prior to distribution matching, the set of bits are uniformly (e.g., randomly) distributed, such that each individual bit may have an equal likelihood of being a 0 or a 1. Distribution matching may include converting the set of bits (e.g., k input bits) into a corresponding sequence of symbols (e.g., n symbols) according to a distribution matching rate, where different symbols within a pool of possible symbols have different likelihoods of being included in the corresponding sequence of symbols—that is, the different possible symbols may have different associated probabilities of selection in accordance with a non-uniform probability distribution. For example, where different symbols correspond to different amplitudes (e.g., where the symbols are amplitude-shift keying (ASK) symbols), some amplitudes may be more likely to be included in the sequence than others based on the non-uniform probability distribution.

Thus, whereas an input set of k bits may be uniformly distributed, a corresponding sequence of n symbols obtained via distribution matching may be non-uniformly distributed, with some symbols more likely be to be included in the sequence of n symbols (e.g., appearing more often with the sequence) than others. A non-uniform sequence of symbols obtained via distribution matching may be converted to a corresponding bit sequence, and the corresponding bit sequence may be used for constellation mapping (e.g., mapping to the modulation symbols, such as QAM symbols, to achieve PCS). Symbols obtained via distribution matching may in some cases be referred to herein as interim symbols (e.g., as opposed to modulation symbols, which may be transmitted over the air). Similarly, at a receiving device (e.g., BS 102, UE 104, or any other wireless device described herein capable of receiving wireless signals) symbols subjected to distribution dematching (which may be an inverse process with respect to distribution matching) in order to obtain a corresponding bit sequence may in some cases be referred to herein as interim symbols.

Figure 5:
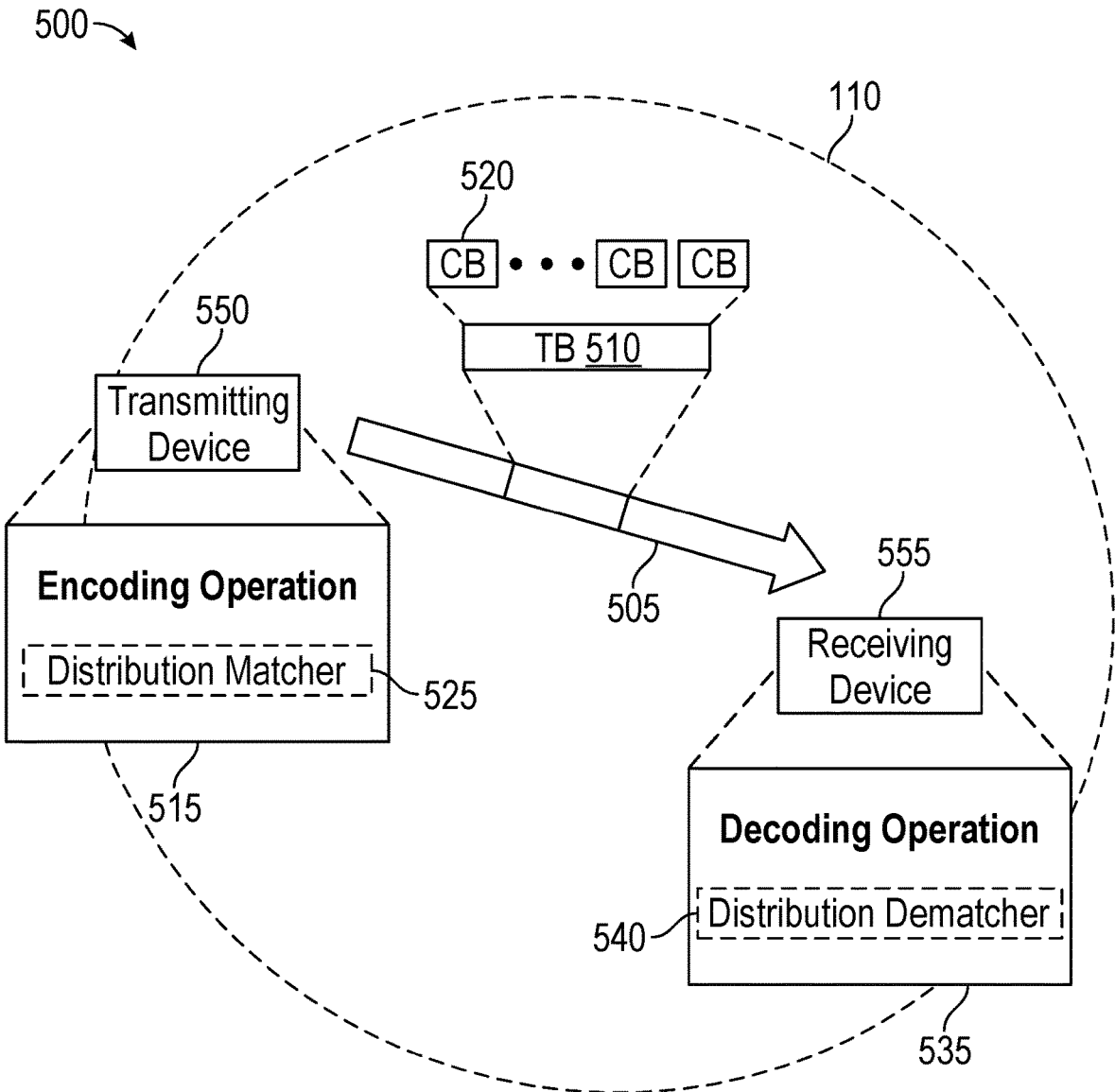
FIG. 5 illustrates an example of a wireless communications system that supports distribution matching for probabilistic constellation shaping (PCS) in wireless communications in accordance with aspects of the present disclosure.

FIG. 5 illustrates an example of a wireless communications system 500 that supports distribution matching for PCS in wireless communications in accordance with aspects of the present disclosure. In some examples, the wireless communications system 500 may implement aspects of wireless communications network 100. The wireless communications system 500 may include a transmitting device 550, which may be an example of the BS 102, UE 104, or any other device capable of transmitting wireless signals as described herein. The wireless communications system 500 may also include a receiving device 555, which may be an example of the BS 102, UE 104, or any other device capable of receiving wireless signals as described herein. As shown, the transmitting device 550 and the receiving device 555 may communicate with each other within a geographic coverage area, such as the geographic coverage area 110.

In some examples, a transmitting device 550 may communicate information to a receiving device, such as UE 104, via a communication link 505, which may be an example of a communication link 120 as described with reference to FIG. 1. For example, the transmitting device 550 may process bits of a transport block (TB) 510 to obtain a corresponding set of modulation symbols, and transmitting device 550 may transmit, via the communication link 505, signaling that is based on (e.g., includes or is otherwise modulated based on) the set of modulation symbols, in order to communicate the TB 510 to the receiving device 555.

In some examples, the transmitting device 550 may perform an encoding operation 515 on the TB 510. For example, the transmitting device 550 may encode the set of bits corresponding to the TB 510 in order to obtain a set of modulation symbols (e.g., QAM symbols) representative of the TB 510, and the transmitting device 550 may transmit the TB 510 to the receiving device 555 by transmitting the corresponding set of modulation symbols. In some examples, the encoding operation 515 may include several stages, such as attaching one or more CRC bits to the set of bits, encoding (e.g., low-density parity-check code (LDPC) encoding, Polar code encoding, forward error correction or other channel coding, or any combination thereof) as described in more detail with reference to FIG. 6, and constellation mapping (e.g., mapping bits or groups of bits to corresponding modulation symbols), among other possible stages.

The transmitting device 550 may modulate a transmission according to a modulation format to represent the information conveyed by the transmission. For example, OFDM modulation may be based on modulating various subcarriers (e.g., using QAM modulation) and transmitting the modulated subcarriers in parallel (e.g., concurrent) using FDM techniques. Regardless of the specific modulation format used, modulation symbols corresponding to a TB 510 may be obtained and transmitted by the transmitting device 550 to convey the information represented by the bits of the TB 510. In some examples, modulation symbols may refer to symbols based on any type of modulation, such as QAM symbols, binary phase shift keying (BPSK) symbols, quadrature phase shift keying (QPSK) symbols, amplitude and phase shift keying (APSK) symbols, or the like.

In some cases, the transmitting device 550 may implement PCS, which may provide advantages when compared with other unshaped modulation types. For example, when unshaped modulation is used, each modulation symbol of a corresponding symbol constellation may be equally likely to be used and hence, over time, may be used equally often. Unshaped modulation may be described as based on a uniform probability distribution, as the probability of use is uniform across the different symbols of the symbol constellation. When PCS is used, however, different modulation symbols of a corresponding symbol constellation may have different probabilities of use-hence, the probability of use may be non-uniform across the different symbols of the symbol constellation. PCS may improve spectral efficiency and allow communications to more closely approach the Shannon capacity (e.g., a theoretical maximum amount of information or data capacity that can be sent over a channel or medium). Additionally or alternatively, PCS may improve power consumption—for example, modulation symbols with smaller amplitudes may be used more frequently than modulation symbols with larger amplitudes.

The transmitting device 550 may identify a set of source information bits, which may be a set of bits corresponding to (e.g., included in or otherwise represented by) the TB 510. The transmitting device 550 may divide the set of source information into a first subset of bits, upon which distribution matching may be performed, and a second subset of bits, upon which distribution matching may not be performed. The first subset of bits may be processed by the transmitting device 550 to obtain a corresponding set of shaped (e.g., distribution matched) bits. The transmitting device 550 may perform constellation mapping such that the amplitudes of modulation symbols sent via communication link 505 for the TB 510 are based on the shaped bits, and the signs of the modulation symbols sent via communication link 505 for the TB 510 are based on the unshaped second subset of bits.

In some examples, the transmitting device 550 may implement a distribution matcher 525 to perform distribution matching (e.g., as part of the encoding operation 515). The distribution matcher 525 may perform any quantity of distribution matching procedures, each of which may accept as an input a uniformly distributed bit sequence with length n and output a symbol sequence of length k with a non-uniform probability distribution, as described in further detail with respect to FIG. 6, for example. The non-uniform probability distribution may be, for example, a probability mass function (PMF). In some examples, the rate loss of a message sent via communication link 505 may vary as a function of k/n. Thus, for a given probability distribution, the rate loss may decrease with an increase of n. However, the encoding and decoding complexity and latency may increase with the increase of n. In some cases, the transmitting device 550 may divide a set of bits for distribution matching (e.g., the first subset of the TB 510 bits) into multiple bit groups and perform separate distribution matching procedures on the different bit groups (e.g., the distribution matcher 525 may perform multiple distribution matching procedures as part of processing a single TB 510), which may be advantageous in view of such tradeoffs.

The transmitting device 550 may generate a CRC for the TB 510 (which may be referred to as a TB CRC), and there may be multiple options for the processing stage at which the transmitting device generates and attaches the TB CRC (e.g., as part of the encoding operation 515). For example, the transmitting device 550 may generate and attach the TB CRC prior to distribution matching or after distribution matching. If the transmitting device 550 generates and attaches the TB CRC prior to distribution matching, then the receiving device 555 may perform distribution matching prior to checking the TB CRC. And if the transmitting device 550 generates and attaches the TB CRC prior to distribution matching, then the receiving device 555 may perform distribution matching prior to checking the TB CRC.

In some examples, the transmitting device 550 may transmit the TB 510 by transmitting a corresponding set of CBs 520, each which may correspond to a portion of the TB 510. In some cases, a first portion of each CB 520 may be based on a corresponding portion of the shaped bits of the TB 510, and a second portion of each CB 520 may be based on a corresponding portion of the unshaped bits of the TB 510. The quantity of CBs 520 may be equal to the quantity of bit groups into which the first subset of bits is divided for distribution matching purposes (e.g., the quantity of CBs 520 for the TB 510 may be equal to the quantity of distribution matching procedures performed for the TB 510). Alternatively, the quantity of CBs 520 may be greater than or less than the quantity of bit groups into which the first subset of bits is divided for distribution matching purposes (e.g., the quantity of CBs 520 for the TB 510 may be greater than or less than the quantity of distribution matching procedures performed for the TB 510).

In some cases, the distribution matcher 525 may perform a fixed-to-fixed (f2f) distribution matching procedure, in which the values of k and n are both fixed (e.g., each input set of bits includes a same quantity of bits, and each output set of interim symbols includes a same quantity of output symbols). In other cases, the distribution matcher 525 may perform a variable-to-fixed (v2f) distribution matching procedure, in which the value of n is fixed, but the value of k is variable (e.g., each output set of interim symbols includes a same quantity of output symbols, but the quantity of input bits upon which an output set of interim symbols is based may be variable). Thus, the quantity of bits that a v2f distribution matching procedure handles (e.g., processes) may vary from one instance of the v2f distribution matching procedure to another—e.g., the value of k may depend on which particular interim symbols are included in an output sequence of n interim symbols. For a single TB 510, the distribution matcher 525 may perform one or more f2f distribution matching procedures, one or more v2f distribution matching procedures, or any combination thereof.

The transmitting device 550 may transmit the modulation symbols corresponding to the TB 510 over communication link 505, and the receiving device 555 may thereby receive the modulation symbols corresponding to the TB 510. The receiving device 555 perform a decoding operation 535 to process the TB 510 (e.g., to obtain the bits of the TB 510 based on the corresponding modulation symbols). The decoding operation 535 performed by the receiving device 555 may be an inverse of the encoding operation 515 performed by the transmitting device 550. For example, the decoding operation 535 may include one or more distribution dematching procedures. A distribution dematching procedure may accept an input sequence of interim symbols (e.g., n interim symbols) and output a corresponding set of bits (e.g., k bits). To perform distribution dematching, the receiving device 555 may include any quantity of distribution dematchers 540, which may be f2f, v2f, or any combination thereof. An f2f distribution dematcher 540 may accept a fixed quantity of interim symbols as an input sequence (e.g., n may be fixed) and may output a corresponding set of bits, where the quantity of bits in the corresponding set of bits is also fixed (e.g., k may be fixed). A v2f distribution dematcher 540 may accept a fixed quantity of interim symbols as an input sequence (e.g., n may be fixed) and may output a corresponding set of bits, where the quantity of bits in the corresponding set of bits is variable (e.g., k may be variable), with the quantity of bits in the corresponding set of bits depending on the particular interim symbols included in the input sequence of interim symbols.

The transmitting device 550 may determine a size of the TB 510 (e.g., a quantity of bits included in the TB 510) based on one or more factors. For example, the transmitting device 550 may determine a size of the TB 510 based on a quantity of resource elements to which the TB 510 may be mapped, a quantity of transmission layers (e.g., MIMO layers) via which the TB 510 may be transmitted, a modulation and coding scheme for transmitting the TB 510 (e.g., a modulation order of the modulation symbols for transmitting the TB 510, a coding rate-such as a forward error correcting (FEC) or other channel coding rate for transmitting the TB 510), a rate associated with the distribution matching for the TB 510 (e.g., a ratio of kin for each of the one or more distribution matching procedures performed by the distribution matcher 525), or any combination thereof. In examples in which one or more v2f distribution matching procedures are performed, an average (e.g., long-term average) rate associated with the distribution matching may be used to determine the size of the TB 510.

In some cases, the transmitting device 550 may determine the total quantity of shaped bits for a TB 510 (e.g., quantity of bits in the first subset of TB bits that are identified upon which distribution matching is performed) and additionally or alternatively a total quantity of interim symbols for the TB 510 based on the quantity of resource elements to which the TB 510 may be mapped, the quantity of transmission layers via which the TB 510 may be transmitted, the modulation order of the modulation symbols for transmitting the TB 510, or any combination thereof. Additionally or alternatively, the transmitting device 550 may determine the total quantity of unshaped bits for the TB 510 (e.g., quantity of bits in the second subset of TB bits upon which distribution matching is not performed) based on the quantity of resource elements to which the TB 510 may be mapped, the quantity of transmission layers via which the TB 510 may be transmitted, the modulation order of the modulation symbols for transmitting the TB 510, the coding rate (e.g., an FEC or other channel coding rate) for transmitting the TB 510, or any combination thereof.

The receiving device 555 may determine (e.g., calculate) the size of the TB 510, the total quantity of shaped bits, total quantity of interim symbols, and total quantity of unshaped bits for the TB 510 in the same manner as the transmitting device 550—e.g., based on the same factors, which may be separately communicated to the receiving device 555 (e.g., via higher-layer signaling) or otherwise known to the receiving device 555 (e.g., based on being specified in one or more communication standards or otherwise preconfigured).

In some examples, if the transmitting device 550 and the receiving device 555 support the use of multiple distribution or dematching procedures per TB 510, a maximum quantity of input or output bits per distribution matching or dematching procedure (e.g., a maximum value of k), a maximum quantity of interim symbols per distribution matching or dematching procedure (e.g., a maximum value of n), or both, may be defined. The maximum quantity of input or output bits per distribution matching or dematching procedure may be referred to as $D_{MAX}$. The maximum quantity of interim symbols per distribution matching or dematching procedure may be referred to as $N_{MAX}$. In some cases, $D_{MAX}$, $N_{MAX}$, or both may be configured by the BS 102 and communicated to the UE 104 (e.g., via RRC or other higher-layer signaling).

If $D_{MAX}$ is defined, the quantity of distribution matching or dematching procedures performed for a TB 510 may be calculated according to Equation 1:

$$D = \lceil N_{AMP} / D_{MAX} \rceil, \tag{1}$$

where D is the quantity of distribution matching or dematching procedures performed for the TB 510, and where $N_{AMP}$ is the total quantity of amplitude bits for the TB 510 (e.g., a quantity of bits in the first subset of the TB bits upon which distribution matching is to be performed).

If $N_{MAX}$ is defined, the quantity of distribution matching or dematching procedures performed for a TB 510 may be calculated according to Equation 2:

$$D = \lceil N_{RE} / N_{MAX} \rceil, \tag{2}$$

where D is the quantity of distribution matching or dematching procedures performed for the TB 510, and where $N_{RE}$ is the quantity of resource elements to which the TB 510 is to be mapped. Multiplying by 2 or some other factor may relate to a translation between the modulation symbols (e.g., as mapped to resource elements) and interim symbols, such as a translation between respective quantities of dimensions associated with the two types of symbols (e.g., translating between wo-dimensional QAM symbols, which may have both an in-phase and quadrature component and hence be considered two-dimensional, and ASK symbols, which may be considered one-dimensional). Additionally or alternatively, in some cases, the total quantity of modulation symbols for a TB 510 may be equal to $2N_{RE} \times \gamma v$ where v is the quantity of spatial layers used to transmit the TB 510, and hence in some cases the numerator of Equation 2 above may further include a multiplication by v.

Figure 6:
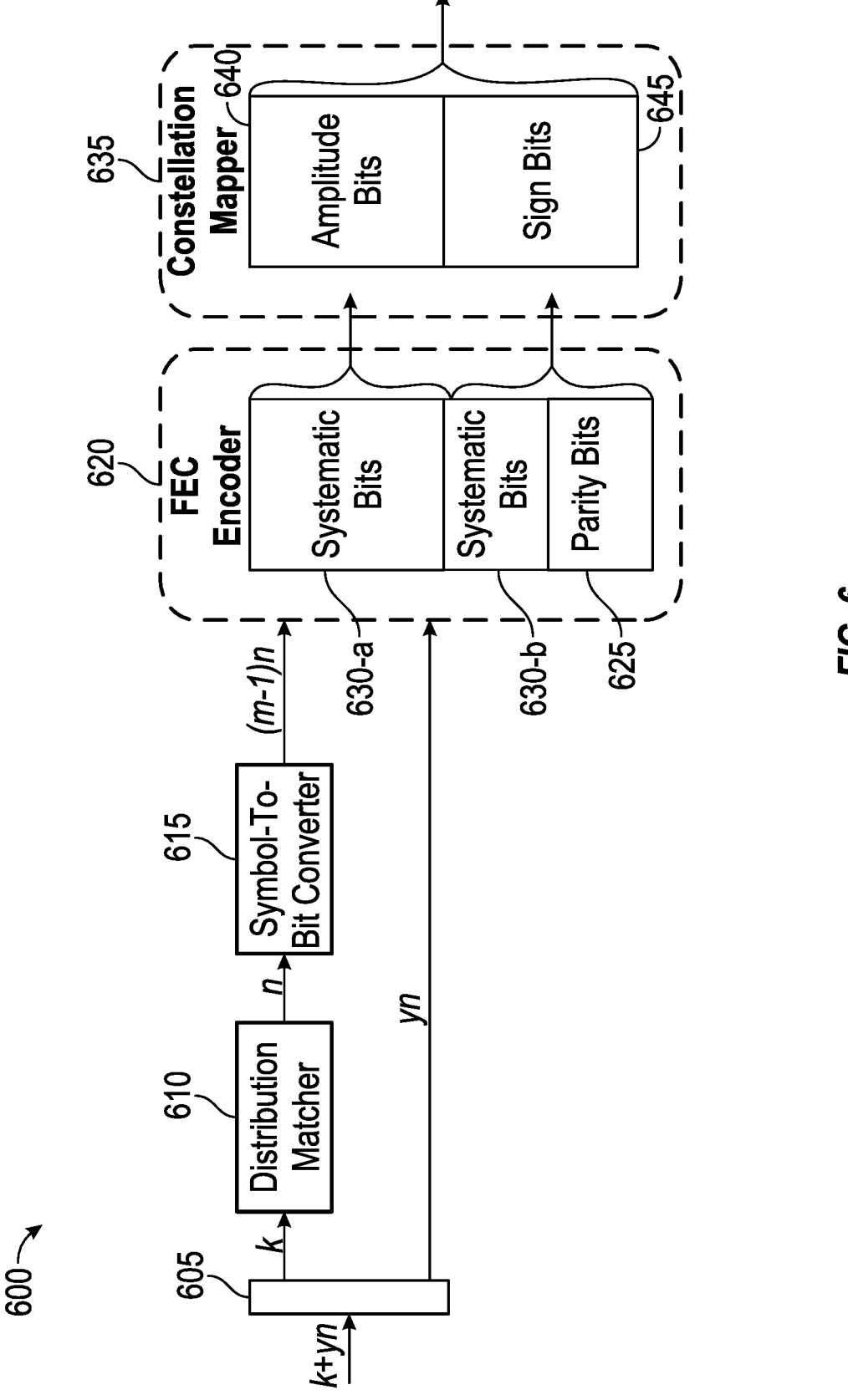
FIG. 6 illustrates an example of an encoding process that supports distribution matching for PCS in wireless communications in accordance with aspects of the present disclosure.

FIG. 6 illustrates an example of an encoding process 600 that supports distribution matching for PCS in wireless communications in accordance with aspects of the present disclosure. In some examples, encoding process 600 may be implemented by aspects of wireless communications network 100 and wireless communications system 500. For example, a transmitting device (e.g., a transmitting device 550) may encode a message for transmission to a receiving device (e.g., a receiving device 555) using PCS according to encoding process 600. In some examples, the receiving device may perform a decoding operation comprising inverse operations corresponding to the operations of encoding process 600. Encoding process 600 may include aspects of an encoding operation 515.

In some examples, the transmitting device may encode a set of bits (e.g., a TB or a CB), then transmit corresponding modulation symbols to the receiving device. The quantity of bits included in the set of bits may be represented as k+γn, where k may represent the quantity of bits within a first subset of the bits and γn may represent the quantity of bits within a second subset of the bits. The k bits in the first subset may be subjected to distribution matching (e.g., may be referred to as shaped bits, or alternatively referred to as amplitude bits), and the γn bits in the second subset may not be subjected to distribution matching (e.g., may be referred to as unshaped bits, or alternatively referred to as sign bits).

The transmitting device may input the k bits of the first subset to a distribution matcher 610, which may be an example of a distribution matcher 525 as described with reference to FIG. 5. The distribution matcher 610 may be a constant-composition distribution matcher (CCDM), a multiset-partition distribution matcher (MPDM), or may use sphere shaping, among other possible distribution matching techniques. The distribution matcher 610 may transform k input bits into n intermediate or interim symbols. For example, sequences within the k input bits may each be mapped to one or more corresponding interim symbols within the n-length sequence of interim symbols. Thus, in some cases, each interim symbol may represent multiple input bits. Based on a non-uniform probability distribution associated with (e.g., used by) the distribution matcher 610, different interim symbols within a pool of possible (e.g., candidate) interim symbols may not be equally likely to be included in the n-length sequence of interim symbols—that is, some interim symbols may be more likely to be included than others. In some cases, the interim symbols may be ASK symbols.

The transmitting device may input the n interim symbols into a symbol-to-bit converter 615. The symbol-to-bit converter 615 may convert the interim symbols into bits. In some cases, because the interim symbols are non-uniformly distributed, the bits output by the symbol-to-bit converter 615 may not be the same as the bits input to the distribution matcher 610. For example, the symbol-to-bit converter 615 may output a bit sequence that includes quantity (m-1) n of bits, where m is a modulation order of the interim symbols (e.g., the quantity of different interim symbols within the pool of possible interim symbols may be equal to 2m).

In some examples, the transmitting device may input the (m-1) n-length bit sequence output by the symbol-to-bit converter 615 and the γn unshaped bits to an FEC encoder 620. The FEC encoder 620 may support error correction for the subsequent transmission based on encoding redundancy into the transmission. Based on the bits input to the FEC encoder 620, the FEC encoder 620 may generate systematic bits 630 and parity bits 625. For example, for every (m−1+γ) input bits, the FEC encoder 620 may generate m bits, where the extra bits may be parity bits 625. Thus, in some examples, the rate of encoding at the FEC encoder 620 may be calculated based on Equation 3, below. In some cases, the transmitting device may determine γ based on the RateFEC.

$$RateFEC = (m - 1 + \gamma m)/m. \qquad (3)$$

In some examples, at 635, the transmitting device may input the bits output from the FEC encoder 620 to a constellation mapper 635, which may perform constellation mapping (e.g., map the bits input to the constellation mapper 635 to corresponding modulation symbols, based on a symbol constellation associated with the modulation symbols). A subset of the bits input to the constellation mapper 635 may be used to determine the amplitudes of the mapped-to modulation symbols, and these bits may be referred to as amplitude bits 640. Another subset of the bits input to the constellation mapper 635 may be used to determine the signs (e.g., polarities, phases, or both) of the mapped-to modulation symbols, and these bits may be referred to as sign bits 645. The amplitude bits 640 may include a first set of systematic bits 630-*a*, which may correspond to the shaped bits (bit sequence) output by the symbol-to-bit converter 615 and thus the k bits subjected to distribution matching. The sign bits 645 may include a second set of systematic bits 630-*b*, which may correspond to the unshaped γn bits, along with the parity bits 625. The γn bits and the parity bits 625 may be unshaped and thus uniformly distributed (e.g., each such bit may be equally likely to be a 1 or a 0).

Because a portion of the bits input to the constellation mapper 635 have been shaped, different modulation symbols within the symbol constellation used by the constellation mapper 635 may have different likelihoods of being mapped to and transmitted over the air, and thus PCS may be implemented. For example, because the amplitude bits 640 are based on the k bits subjected to distribution matching by the distribution matcher 610, the likelihood of a modulation symbol being mapped to may depend on the amplitude of the modulation symbol (e.g., lower amplitude modulation symbols, which may be nearer to a center of the symbol constellation, may be more likely to be mapped to than higher amplitude modulation symbols, which may be further from the center of the symbols constellation). In some case, the transmitting device may multiply the amplitude bits 640 with the sign bits 645 and map the resulting products to the modulation symbols.

Aspects Related to Probabilistic Constellation Shaping Schemes for Multiple Layer Transmissions In order to transmit information from a transmitting device to a receiving device, the information may be organized into a transport block (TB). The TB may be input into a cyclic redundancy check (CRC) encoder, which output a set of CRC bits that may be concatenated to the TB. Thereafter, for data transmissions (e.g., as opposed to control transmissions), a low-density parity-check (LDPC) base graph may be selected. The TB may then be segmented into a plurality of code blocks, including one or more code blocks carrying data information intended for transmission and a CRC code block including the CRC bits. Thereafter, the plurality of code block may be encoded using the selected LDPC base graph. Rate matching may then be performed on the encoded code blocks, which may then be concatenated together. The concatenated code blocks may then be scrambled (e.g., using a 31-length gold sequence) and modulated to obtain a set of modulation symbols of a codeword.

In some cases, a type of modulation that should be used to perform the modulation of the concatenated code blocks may be indicated using a channel quality indicator (CQI) index and a lookup table that maps different CQI indices to different types of modulation schemes (e.g., QPSK, 16QAM, 64QAM, 256QAM, etc.). Further, a modulating the concatenated code blocks may be based on a particular modulation and coding scheme (MCS). In some cases, the MCS may be indicated using an MCS index. The MCS index may be used to determine one or more parameters from an MCS lookup table for modulating the concatenated code blocks, such as a modulation order (MO), a target code rate, spectral efficiency (SE), etc.

After modulation, the set of modulation symbols of the codeword may be mapped to one or more transmission layers, which, in turn, may be mapped to one or more antenna ports of the transmitting device. Thereafter, the modulation symbols associated with a particular layer and antenna port may be mapped to one or more virtual resource blocks (VRBs) and, thereafter, mapped to one or more physical resource block (PRBs) for transmission to the receiving device (e.g., via an antenna to which the modulation symbols are mapped).

As noted above, in some cases, a technique known as probabilistic constellation shaping (PCS) when processing information (e.g., encoding, modulating, etc.) for transmission. PCS may improve spectral efficiency and allow communications to more closely approach the Shannon capacity (e.g., a theoretical maximum amount of information or data capacity that can be sent over a channel or medium). Additionally PCS may improve power consumption—for example, modulation symbols with smaller amplitudes may be used more frequently than modulation symbols with larger amplitudes.

PCS may involve mapping bits to modulation symbols (e.g., quadrature amplitude modulation (QAM) symbols) such that some modulation symbols of a symbol constellation may be more likely to be mapped to, and thus transmitted over the air, than others. In some cases, this mapping may be based on a non-uniform probability distribution associated with a probability mass function (PMF). To support PCS, the transmitting device may perform distribution matching (DM) on a set of input bits for which constellation mapping (e.g., the selection of corresponding modulation symbols from a symbol constellation) is to be performed.

For example, DM may include converting the set of input bits into a corresponding sequence of symbols according to a DM rate, where different symbols within a pool of possible symbols have different likelihoods of being included in the corresponding sequence of symbols—that is, the different possible symbols may have different associated probabilities of selection in accordance with a non-uniform probability distribution. Thus, whereas the set of input bits may be uniformly distributed, the corresponding sequence of symbols obtained via distribution matching may be non-uniformly distributed, with some symbols more likely be to be included in the sequence of symbols (e.g., appearing more often with the sequence) than others. A non-uniform sequence of symbols obtained via distribution matching may be converted to a corresponding bit sequence, and the corresponding bit sequence may be used for constellation mapping (e.g., mapping to the modulation symbols, such as QAM symbols, to achieve PCS) during modulation.

While PCS may improve spectral efficiency and improve power consumption, existing techniques for modulating information based on an MCS index and MCS table may not be sufficient to support PCS. For example, current MCS tables are designed only for uniform constellations with equal/uniform probability. Additionally, current constellation mappers used in the modulation process may only use uniform constellations with equal/uniform probability distributions. For example, constellation points may be normalized for a given modulation order.

In some cases, a transmitting device may transmit information to a receiving device using multiple transmission layers. For example, in some cases, a single codeword may map to multiple layers which each use a common MCS (including modulation order) and FEC rate. In some cases, channel conditions (e.g., an effective signal to noise ratio (SNR)) can vary significantly among the multiple layers used for transmitting this single codeword. These varying channel conditions may be problematic when using PCS as an optimal PMF or probability distribution for PCS may be sensitive to the channel conditions of each layer. In other words, a PMF or probability distribution used for one layer may not be sufficient for use with another layer. Using a PMF or probability distribution that is not sufficient for a particular layer may lead to information transmitted via this particular layer not being received correctly by a receiving device, leading to possible retransmissions of this information and, as a result, wasted time and frequency resources within a wireless network as well as wasted power resources at the transmitting device and receiving device. As such, layer-based DM rate adaption (e.g., involving using different DM rates per layer) may be helpful for link adaption.

Accordingly, aspects of the provide techniques for supporting PCS when using multi-layer transmissions. For example, in some cases, such techniques may involve improved MCS indication to better support PCS for multi-layer transmissions. Additionally, these techniques may involve the use of different DM rates, and thereby PMF/probability distributions, for different layers of a codeword for better link adaption for PCS. In such cases, the techniques presented herein may also involve the configuration and use of different scaling values that may be used during modulation. For example, for given a modulation order, different scaling values may be used for constellation points at a modulation due to different PMF or probability distributions. In some cases, these scaling values may be consistent between the transmitter device and the receiver device for proper demodulation.

Example Coding Flows for Probabilistic Constellation Shaping Schemes with Multiple Layer Transmissions As noted above, a single codeword may be mapped to and transmitted via multiple layers. In such cases, this codeword may be configured with a single MCS, resulting in a same modulation order and a same FEC rate for all the layers associated with this codeword. In some case, when a rank of greater than four is configured (e.g., indicating a number of layers for transmission), then two codewords with different MCS may be used. When multiple layers are used for transmission of information bits, the information bits for transmission via different layers may be encoded using different FEC encoding schemes.

For example, in a first FEC encoding scheme, information bits for transmission via different layers may be combined and jointly encoded. In such cases, after being encoded, the encoded information bits may be divided up into different subsets, each being mapped by a layer mapper to a respective layer, and modulated. In another FEC encoding scheme, information bits for transmission via different layers may be encoded separately, using separate encoding processes. In such cases, a layer mapper may not be necessary as the separately encoded information bits are already be mapped to their respective different layers. In either FEC encoding scheme, to support PCS for multi-layer transmissions, the information bits for the different layers may be distribution matching (DM) encoded with separate DM modules. Additionally, in either FEC encoding scheme, modulated symbols for each different layer may be generated separately. These FEC encoding scheme are described in greater detail with respect to FIGS. 7 and 8.

Figure 7:
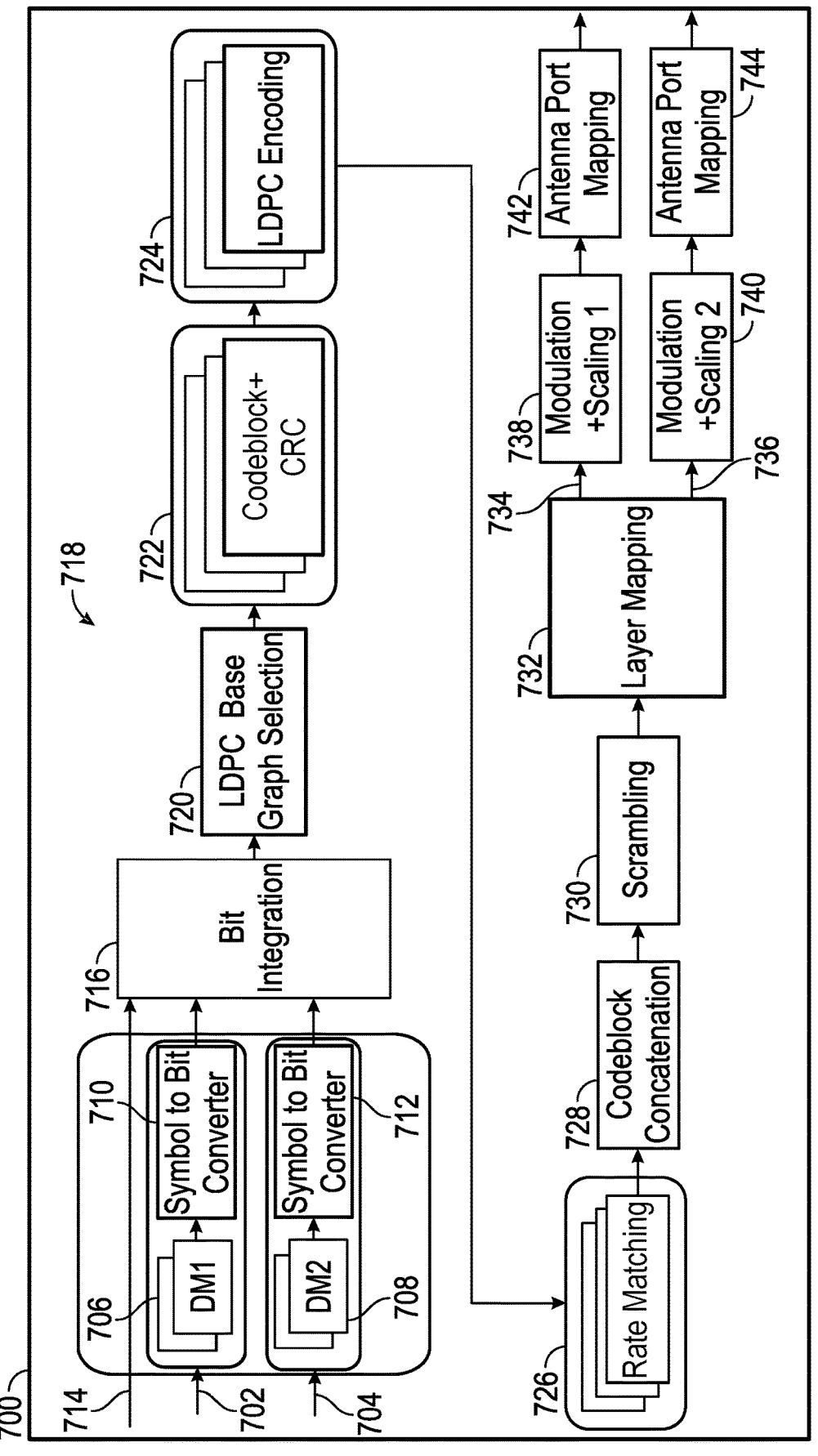
FIG. 7 illustrates an example flow diagram illustrating a joint encoding scheme for supporting PCS for multi-layer transmissions.

FIG. 7 illustrates an example flow diagram illustrating a joint encoding scheme for supporting PCS for multi-layer transmissions. In some cases, the joint encoding scheme illustrated in FIG. 7 may be performed by one or more components (e.g., one or more of the processors illustrated in FIG. 3) of a transmitting device 700. The transmitting device 700 may include, for example, the BS 102, the UE

104 or any other wireless communication device that is capable of transmitting wireless signals as described herein.

While not illustrated in FIG. 7, the joint encoding process may begin with identifying or obtaining a set of bits corresponding to a transport block (TB) for communication via a multi-layer transmission. In some cases, the set of bits may comprise a plurality of subsets of bits and may correspond to a data channel transmission, such as a physical uplink shared channel (PUSCH) transmission or physical downlink shared channel (PDSCH) transmission. In such cases, each subset of bits may correspond to a respective layer of the multi-layer transmission. In some cases, a number of bits of the set of bits that are included within a particular subset of bits corresponding to a respective layer may be based on a DM rate and on a respective probability distribution for that respective layer. FIG. 7 illustrates an example in which the multi-layer transmission includes two layers and, as a result, there are at least two subsets of bits, such as a first subset of bits 702 and a second subset of bit 704. The first subset of bits 702 may include one or more amplitude bits associated with a first layer of the multi-layer transmission while the second subset of bits 704 may include one or more amplitude bits associated with a second layer of the multi-layer transmission.

Thereafter, distribution matching may be performed on each subset of bits. For example, performing the distribution matching may include, for each subset of bits and corresponding respective layer of the multi-layer transmission, using a different distribution matching encoder to apply a respective probability distribution to that subset of bits to obtain a plurality of subsets of distributed symbols. For example, as shown in FIG. 7, the first subset of bits 702 corresponding to the first layer may be input into a first DM module 706 while the second subset of bits 704 corresponding to the second layer may be input into a second DM module 708. In some cases, the first DM module 706 may be configured to perform distribution matching on the first subset of bits 704 based on a first DM rate for the first layer to obtain a first subset of distributed symbols based on a non-uniform probability distribution associated with the first DM rate. Similarly, the second DM module 708 may be configured to perform distribution matching on the second subset of bits 704 based on a second DM rate for the second layer to obtain a second subset of distributed symbols based on a non-uniform probability distribution associated with the second DM rate. In some cases, a first DM module 706 and the second DM module 708 may be configured to perform distribution matching in accordance with techniques described above.

In some cases, the transmitting device 700 may be configured to determine a respective DM rate for each layer (e.g., the first DM rate for the first layer and the second DM rate for the second layer) of the multi-layer transmission. For example, in some cases, the transmitting device 700 may obtain a configuration for performing a PCS modulation scheme, indicating the set of parameters for different layers of the multi-layer transmission. In some cases, when the transmitting device 700 comprises a UE, such as the UE 104, the transmitting device 700 may obtain/receive the configuration from a network entity, such as the BS 102 and a disaggregated BS as described with respect to FIG. 2.

In some cases, the set of parameters indicated by the configuration may include a transmission rank and a respective MCS index for each layer of the multi-layer transmission. The transmission rank may indicate to the transmitting device 700 a number of layers of the multi-layer transmission. In such cases, determining the respective DM rate for each layer of the multi-layer transmission may be based on a joint lookup table and the set of parameters. For example, the joint lookup table may map the respective DM rate for a particular layer to the respective MCS index for that layer of the multi-layer transmission, a modulation order for that layer of the multi-layer transmission, a FEC rate for that layer of the multi-layer transmission, and a spectral efficiency for that layer of the multi-layer transmission. An example of this joint lookup table is illustrated in Table 1, below.

TABLE 1

| MCS Index | Modulation Order | Target Code Rate (FEC) | DM Rate | Spectral efficiency bit/s/Hz |
|---|---|---|---|---|
| 0 | 2 | | | |
| ... | ... | | | |
| 10 | 4 | 0.5 | 0.5 | 1 |
| 11 | | | 0.6 | 1.2 |
| 12 | | | 0.8 | 1.6 |
| ... | ... | ... | ... | ... |

As shown, Table 1 maps a particular MCS index to a MO, FEC rate, DM rate, and spectral efficiency. For example, assume that the set of parameters received in the configuration by the transmitting device 700 indicates an MCS index of 11. In this case, the transmitting device 700 may use joint MCS-DM rate table as shown in Table 1 to determine the modulation order for the multi-layer transmission to be 4, the FEC rate to be 0.5, the DM rate to be 0.6, and the spectral efficiency may be 1.2. As shown in Table 1, a single modulation order and single FEC rate may map to multiple DM rates, which generate multiple spectral efficiencies. In some cases, only high FEC code rates may be used in PCS system, which may be helpful to reduce the encoding complexity $$\left( \text{e.g., } \frac{M-2}{M} < R_F < 1 \right).$$

In some cases, when using the joint MCS-DM rate table as shown in Table 1, one MCS index may need to be indicated for each layer of the multi-layer transmission.

The spectral efficiency is a number of bits transmitted over a frequency bandwidth in a specific time and is measured in bits/s/Hz. Spectral efficiency is proportional to throughput as the throughput is also bits per time transmitted in a certain bandwidth. In some cases, the total spectral efficiency may be derived at least based on the modulation order, the FEC code rate, the rate of the distribution matcher. For example, for PCS, the spectral efficiency (SE) may be determined according to: $SE = M \cdot R_F + (M-2) \cdot (R_d - 1)$, where M is the modulation order (e.g., 16 QAM with M=4, 64QAM with M=6), $R_F$ is the FEC code rate (e.g., where $$\frac{M-2}{M} < R_F < 1 \Bigg),$$

and $R_d$ is the rate of distribution matcher and is equal to $$R_d = \frac{\text{the number of } DM \text{ output bits}}{\text{the number of } DM \text{ input bits}}$$

(e.g., where $0<R_d<1$). The number of DM input bits represents the number of bits input into a DM module while the number of DM output bits represents the number of bits output by the DM module. For example, the number of DM input bits may comprise a number of the first subset of bits 704 that are input into the first DM module 706 while the number of DM output bits are the number of bits that are output by the first DM module 706 after distribution mapping is performed on the first subset of bits 704 based on a probability distribution. In some cases, a probability distribution used to perform distribution matching may have a one-to-one mapping to $R_d$.

In some cases, rather than explicitly indicating a DM rate within a joint table, a probability distribution or PMF may be indicated. For example, in such cases, the joint table may map a particular MCS index to an MO, FEC rate, probability distribution or PMF, and spectral efficiency. In such cases, the respective DM rate for a layer of the multi-layer transmission may be determined based on the probability distribution or PMF mapped to the indicated respective MCS index.

In some cases, rather than use a joint MCS-DM rate table, separate tables may be used to indicate a target coding rate and DM rate for different layers of the multi-layer transmission, as shown below in Tables 2 and 3.

TABLE 2

| FEC code rate lookup table | | |
|---|---|---|
| FEC index | Modulation order | Target code Rate (FEC) |
| 0 | 2 | 0.5 |
| . . . | . . . | |
| 10 | 4 | 0.5 |
| . . . | . . . | . . . |

TABLE 3

| DM rate lookup table | | |
|---|---|---|
| DM index | Modulation order | DM Rate |
| 0 | 4 | 0.5 |
| . . . | . . . | |
| 10 | 6 | 0.6 |
| . . . | . . . | . . . |

In some cases, when separate tables are used, the set of parameters in the configuration obtained by the transmitting device 700 may include a FEC rate index for each layer of the multi-layer transmission and a respective DM index for each layer of the multi-layer transmission. In such cases, the transmitting device 700 may determine an FEC rate to use for encoding the set of bits (e.g., including the first subset of bits 702 and second subset of bits 704) based on the FEC rate index and a first lookup table, such as Table 2. For example, as shown, Table 2 maps an indicated FEC rate index to a modulation order and a target FEC rate. The transmitting device 700 may also determine the respective DM rate for each layer of the multi-layer transmission based on the respective DM index for that layer and a second lookup table, such as Table 3, different from the first lookup table. For example, as shown, Table 3 maps an indicated DM rate index to a modulation order and a target FEC rate. In some cases, rather than indicating the DM rate, Table 3 may instead explicitly indicate different probability distributions, which may be identified based on a probability distribution index indicated in the set of parameters. In some cases, when separate tables are used to configure the FEC rate and DM rate, the total spectral efficiency may be implicitly derived based on the combination of modulation order, the DM rate, and the FEC rate.

In some cases, when the separate FEC rate table and DM rate table are used with multi-layer transmissions, rather than indicating multiple MCS indices for each layer of a multi-layer transmission (e.g., like the joint table described above), the set of parameters indicated by the configuration information may instead indicate multiple DM rate indices, each DM rate index corresponding to a different layer of the multi-layer transmission.

Once the respective DM rate for each layer of the multi-layer transmission is determined by the transmitting device 700, the transmitting device 700 may perform distribution matching, as described above, on the set of bits using the set of parameters to obtain a set of distributed symbols. More specifically, for example, For example, once the first DM rate for the first layer and the second DM rate for the second layer have been determined, the first DM module 706 may perform distribution matching on the first subset of bits 702 and the second DM module 708 may perform distribution matching on the second subset of bits 704 to obtain a plurality of subsets of distributed symbols.

In some cases, performing the distribution matching on the first subset of bits 702 for the first layer may be based on a first probability distribution determined based on the first DM rate and a modulation order for the first layer. Similarly, performing the distribution matching on the second subset of bits 704 for the second layer may be based on a second probability distribution determined based on the second DM rate and a modulation order for the second layer. In some cases, as noted above, the first probability distribution for the first layer and the second probability distribution for the second layer may be explicitly indicated within the set of parameters (e.g., a probability distribution index or PMF index) and determined from a joint table (e.g., Table 1) or a separate table (e.g., Table 3).

Once distribution matching has been performed on the first subset of bits 702, the first DM module 706 outputs a first subset of distributed symbols of the plurality of subsets of distributed symbols. Due to the distribution matching, the first subset of distributed symbols may be non-uniformly distributed. Similarly, once distribution matching has been performed on the second subset of bits 704, the second DM module 708 outputs a second subset of distributed symbols of the plurality of subsets of distributed symbols. Due to the distribution matching, the second subset of distributed symbols may be non-uniformly distributed. The first subset of distributed symbols and the second subset of distributed symbols may make up a set of distributed symbols.

Thereafter, the transmitting device 700 may be configured to convert the set of distributed symbols into the set of distributed bits. This may include converting each subset of distributed symbols of the plurality of subsets of distributed symbols into a respective subset of distributed bits and combining each subset of distributed bits. For example, in some cases, the first subset of distributed symbols and second subset of distributed symbols may be input into respective symbol-to-bit converters 710 and 712 to convert the first subset of distributed symbols into a first subset of distributed bits and the second subset of distributed symbols into a second subset of distributed bits.

Thereafter, each subset of distributed bits (e.g., including the first subset of distributed bits and the second subset of distributed bits) may be input into a bit integration module 716. The bit integration module 716 is configured to combine each subset of distributed bits to obtain the set of distributed bits. In some cases, as illustrated, the first subset of distributed bits (e.g., distributed amplitude bits) and the second subset of distributed bits (e.g., distributed amplitude bits) may also be combined with one or more sign bits 714, as described above.

Thereafter, the set of distributed bits may be encoded to obtain an encoded set of distributed bits. In some cases, as illustrated in FIG. 7, encoding the set of distributed bits to obtain an encoded set of distributed bits may include jointly encoding each subset of distributed bits in the set of distributed bits using a common FEC code rate. For example, because the first subset of distributed bits and the second subset of distributed bits (and in some cases sign bits) are combined by the bit integration module 716, the distributed bits of each of the first subset of distributed bits and the second subset of distributed bits (e.g., corresponding to the first and second layers of the multi-layer transmission, respectively), may be encoded together by one FEC encoding process 718 and using a common FEC encoder.

For example, the set of distributed bits may be input into an LDPC base graph selector 720 configured to select an LDPC base graph for encoding the set of distributed bits. Thereafter, the set of distributed bits are input into a code block segmentation module 722 that is configured to segment the set of distributed bits into a plurality of different code blocks. The set of distributed bits included within the plurality of different code blocks may then be encoded by an encoding module 724 (e.g., based on the selected LDPC base graph) to obtain an encoded set of distributed bits. In some cases, while the set of distributed bits include distributed bits associated with different layers of the multi-layer transmissions (e.g., the first subset of distributed bits associated with the first layer of the multi-layer transmission and the second subset of distributed bits associated with the second layer of the multi-layer transmission), a common FEC code rate may be used for all of the layers of the multi-layer transmission to encode the set of distributed bits.

After being encoded, the plurality of code blocks, including the encoded set of distributed bits, may be input into a rate matcher module 726, which is configured to perform rate matching (e.g., repetition, shortening, puncturing of bits) to adjust a number of bits in the encoded set of distributed bits for transmission. Thereafter, the plurality of code blocks are input into a code block concatenation module 728, which is configured to concatenate each of the code blocks in the plurality of code block together. Thereafter, the concatenated code blocks, including the set of encoded set of distributed bits, may be input into a scrambling module 730, configured to scramble the encoded set of distributed bits (e.g., based on a 31-length gold sequence).

After the encoded set of distributed bits has been scrambled, the encoded set of distributed bits is input into a layer mapping module 732. The layer mapping module 723 may be configured to separate the encoded set of distributed bits into a plurality of subsets of encoded distributed bits, each subset of encoded distributed bits of the plurality of subsets of encoded distributed bits corresponding to a respective layer of the multi-layer transmission. Thereafter, for each subset of encoded distributed bits of the plurality of subsets of encoded distributed bits, the layer mapping module 732 may map that subset of encoded distributed bits to the respective layer corresponding to that subset of encoded distributed bits based on a respective DM rate for the respective layer (e.g., indicated via the set of parameters described above) corresponding to that subset of encoded distributed bits.

For example, in some cases, the layer mapping module 732 may separate the encoded set of distributed bits into a first subset of encoded distributed bits 734 and a second subset of encoded distributed bits 736. Thereafter, the layer mapping module 732 may map the first subset of encoded distributed bits 734 to the first layer of the multi-layer transmission and may map the second subset of encoded distributed bits 736 to the second layer of the multi-layer transmission. In some cases, a size of each of the subsets of encoded distributed bits is based on the respective DM rate for the respective layer corresponding to that subset of encoded distributed bits In some cases, FEC encoding may not change or alter systematic bits and, as such, amplitude bits associated with different layers of the multi-layer transmission may not change. However, sign bits (e.g., sign bits 714) may consist of unshaped source bits, CRC bits, and parity check bits. Hence, the layer mapping module 732 may separately deal with amplitude bits (e.g., included within the first subset of encoded distributed bits 734 and the second subset of encoded distributed bits 736) and sign bits (e.g., sign bits 714). In some cases, during layer mapping, the layer mapping module may place the shaped amplitude bits belonging to a first layer (e.g., included within the first subset of encoded distributed bits 734) into the first layer and the shaped amplitude bits belonging to the second layer (e.g., included within the second subset of encoded distributed bits 736) may be placed into the second layer.

For the sign bits, the layer mapping module 732 may sequentially (or based on some order) read the sign bits 714 (e.g., unshaped source bits, CRC bits, and parity check bits) and put these bits into different layers, respectively. The number of sign bits in each layer may depend on a number of modulated symbols in each layer, which, in some cases, may be the same number in each layer.

After layer mapping, the transmitting device 700 may be configured to perform a modulation procedure on the encoded set of distributed bits in accordance with a PCS modulation scheme to obtain a set of modulation symbols corresponding to a codeword associated with the TB for communication via the multi-layer transmission. For example, the first subset of encoded distributed bits 734 and the second subset of encoded distributed bits 736 may be separately modulate and scaled. For example, as shown, the first subset of encoded distributed bits 734 may be input into a first modulation and scaling module 738 while the second subset of encoded distributed bits 736 may be input into a second modulation and scaling module 740.

In some cases, the first modulation and scaling module 738 may be configured to perform modulation on the first subset of encoded distributed bits 734 for the first layer according to a PCS modulation scheme to obtain a first subset of modulation symbols. Similarly, the second modulation and scaling module 740 may be configured to perform modulation on the second subset of encoded distributed bits 736 for the second layer according to the PCS modulation scheme to obtain a second subset of modulation symbols. In some cases, the first modulation and scaling module 738 may modulate first subset of encoded distributed bits 734 based on a particular modulation format for the first layer, which may be indicated, for example via the set of parameters (e.g., MCS index, modulation order, spectral efficiency, etc.) as described above. Similarly, the second modulation and scaling module 740 may modulate second subset of encoded distributed bits 736 based on a particular modulation format for the second layer, which may be indicated, for example via the set of parameters (e.g., MCS index, modulation order, spectral efficiency, etc.) as described above.

In some cases, when the PCS modulation scheme is used to modulate the first subset of encoded distributed bits 734 and the second subset of encoded distributed bits 736, the resulting set of modulation symbols (e.g., the first subset of modulation symbols and the second subset of modulation symbols) may need to be scaled to match different probability distributions associated with each layer of the multi-layer transmission.

For example, in current systems, modulation may involve mapping modulation symbols to constellation points according to a uniform distribution. In some cases, these modulation symbols prior to layer mapping may be normalized with a unit expectation power, such as $E_{x \in X} [\|x\|^2]=1$. In such cases, assuming a modulation scheme of 16-QAM, the constellation points for 16-QAM may include, for example, $$\left\{ \frac{\pm 1 \pm j}{\sqrt{10}}, \frac{\pm 1 \pm 3j}{\sqrt{10}}, \frac{\pm 3 \pm j}{\sqrt{10}}, \frac{\pm 3 \pm 3j}{\sqrt{10}} \right\}.$$

In some cases, for a given modulation order, the constellation points are same for different spectral efficiency. Additionally, in current systems, the receiver device may assume normalized constellation points to implement demodulation.

When PCS is used, non-uniform probability distributions may be used for different layers of the multi-layer transmission, for example, due to differing channel conditions associated with each layer. In some cases, the transmitting device 700 may determine a respective (non-uniform) probability distribution for each layer of the multi-layer transmission based on one of a respective DM rate for each layer and a modulation order for each layer or an explicit indication of the respective probability distribution for that layer included in the set of parameters. As noted above, the respective DM rate or explicit indicate of the probability distribution may be indicate using the set of parameters (e.g., included within the configuration for performing the PCS modulation scheme) and one or more lookup tables (e.g., Table 1 or Table 3). In some cases, each probability distribution indicates a set of probabilities and each probability of the set of probabilities may be associated with a different constellation point in a set of constellation points.

Due to the non-uniform probability distribution, a probability that a particular modulation symbol will be mapped to a particular constellation point is different for different constellation points. As such, in order to satisfy the expectation power (e.g., 1) when different probability distributions are used for different layers of the multi-layer transmission, modulation symbols for each layer of the multi-layer transmission may need to be scaled to match or account for the different probability distributions. Accordingly, for example, the transmitting device 700 may determine one or more respective scaling values for each layer of the multi-layer transmission based on the respective probability distribution for that layer. Thereafter, when modulating the modulation symbols of the set of modulation symbols for a particular layer of the multi-layer transmission, the transmitting device 700 may apply the one or more respective scaling values to the modulation symbols corresponding to that layer.

For example, in some cases, the first modulation and scaling module 738 may determine one or more scaling values for the first subset of modulation symbols associated with the first layer of the multi-layer transmission. Thereafter, the first modulation and scaling module 738 may then apply the one or more scaling values to the first subset of modulation symbols to account to match the (non-uniform) respective probability distribution associated with the first layer. Similarly, the second modulation and scaling module 740 may determine one or more scaling values for the second subset of modulation symbols associated with the second layer of the multi-layer transmission. Thereafter, the second modulation and scaling module 740 may then apply the one or more scaling values to the second subset of modulation symbols to account to match the (non-uniform) respective probability distribution associated with the first layer.

In some cases, the transmitting device 700 may determine the one or more scaling values based on the power expectation function $E_{x \in X} [\|\Delta^* x\|^2]=1$, where x comprises a constellation point within a probability mass function (PMF) associated with a non-uniform probability distribution and A is the scaling value. For example, assuming a 16-QAM case, the set of constellation points for 16-QAM may include $$\left\{ \frac{\pm 1 \pm j}{\sqrt{10}}, \frac{\pm 1 \pm 3j}{\sqrt{10}}, \frac{\pm 3 \pm j}{\sqrt{10}}, \frac{\pm 3 \pm 3j}{\sqrt{10}} \right\}.$$

The PMF may be given by $$P1 = 0.25 \text{ for } x1 = \frac{\pm 1 \pm j}{\sqrt{10}},$$

P2=P3=0.1 for $$x2 = \frac{\pm 1 \pm 3j}{\sqrt{10}} \text{ and } x3 = \frac{\pm 3 \pm j}{\sqrt{10}},$$

$$P4 = 0.05 \text{ for } x4 = \frac{\pm 3 \pm 3j}{\sqrt{10}}.$$

The scaling factor $\Delta$ may then be derived by $$\frac{1}{P1 * x1^2 + P2 * x2^2 P3 * x3^2 P4 * x4^2}.$$

In some cases, one or more combined modulation and scaling modules, such as the modulation and scaling module 738 and the modulation and scaling module 740 illustrated in FIG. 7, may be implemented to determine the one or more scaling factors for different layers of the multi-layer transmission based on the modulation orders and probability distributions (e.g., DM rate) for the different layers. In other cases, the transmitting device 700 may implement modulation and scaling in separate modules. For example, in some cases, a separate modulation module may modulate the subsets of encoded distributed bits for each respective layer based on a set of uniform distribution constellation points. Thereafter, the one or more scaling factors may be determined and applied by a separate scaling module.

Once the first subset of modulation symbols and the second subset of modulation symbols have been scaled, the first subset of modulation symbols and the second subset of modulation symbols may be mapped to respective antenna ports and transmitted to the receiving device. For example, first subset of modulation symbols may be input in to a first antenna port mapping module 742 associated with the first layer of the multi-layer transmission and mapped to one or more antenna ports of the transmitting device 700. Similarly, the second subset of modulation symbols may be input in to a second antenna port mapping module 744 associated with the second layer of the multi-layer transmission and mapped to one or more antenna ports of the transmitting device 700. Thereafter, the first subset of modulation symbols may be transmitted to the receiving device via the first layer and using the one or more antenna ports of the transmitted device. Likewise, the second subset of modulation symbols may be transmitted to the receiving device via the second layer and using the one or more antenna ports of the transmitted device.

Figure 8:
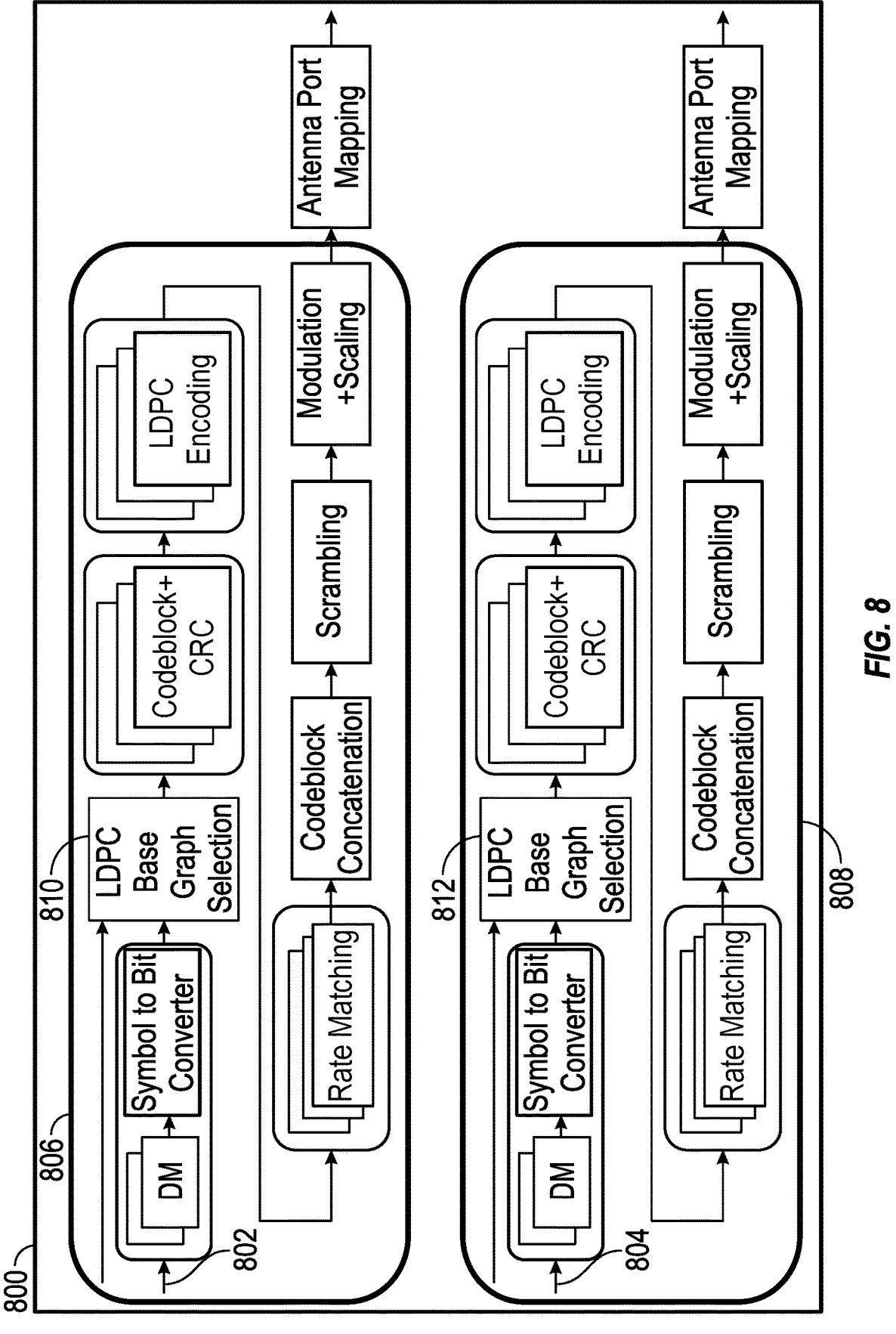
FIG. 8 illustrates an example flow diagram illustrating separate encoding processes for supporting PCS for multi-layer transmissions.

As noted above, in some cases, information bits for transmission via different layers of the multi-layer transmission may be encoded separately, using separate FEC encoding processes. An example of these separate FEC encoding processes is illustrated in FIG. 8. For example, as illustrated, when using separate FEC encoding processes for different layers of a multi-layer transmission, the transmitting device 700 may identify or obtain a set of bits corresponding to a TB for communication via a multi-layer transmission. In some cases, the set of bits may comprise a plurality of subsets of bits and may correspond to a data channel transmission, such as a PUSCH transmission or PDSCH transmission. In such cases, each subset of bits may correspond to a respective layer of the multi-layer transmission. FIG. 7 illustrates an example in which the multi-layer transmission includes two layers and, as a result, there are at least two subsets of bits, such as a first subset of bits 802 and a second subset of bit 804. The first subset of bits 802 may include one or more amplitude bits associated with a first layer of the multi-layer transmission while the second subset of bits 804 may include one or more amplitude bits associated with a second layer of the multi-layer transmission.

In some cases, the first subset of bits 801 and the second subset of bit 804 may be input into separate FEC encoding processes. For example, the first subset of bits 802 may be input into a first FEC encoding process 806 while the second subset of bits 804 may be input into a second FEC encoding process 808. Once the first subset of bits 802 and the second subset of bits 804 are input into their separate respective FEC encoding processes, a remaining portion of the encoding process for encoding the first subset of bits 802 and the second subset of bit 804 is similar to the join encoding process. For example, the first subset of bits 802 and the second subset of bit 804 may be separately distribution matched based on a set of parameters (e.g., rank, MCS index, DM rate, modulation order, etc.).

Unlike the joint encoding process of FIG. 7, however, in FIG. 8, after distribution matching, the resulting subsets of distributed bits for each layer may not be input into a bit integration module (e.g., which would combine the subsets of distributed bits as described above with respect to FIG. 7). Instead, the resulting subsets of distributed bits for each layer are directly input into respective LDPC base graph selection modules (e.g., LDPC base graph module 810 and LDPC base graph module 812). Thereafter, the resulting subsets of distributed bits for each layer may be segmented into pluralities of code blocks, encoded (e.g., using a common FEC code rate for each layer), rate matched, code block concatenated, and scrambled, similar to FIG. 7.

As can be seen in FIG. 8, because separate encoding processes are used to distribution match and encode subsets of bits for different layers of a multi-layer transmission, after encoding, a layer mapping module may not be necessary to map the encoded subsets of distributed bits to their respective layers as in FIG. 7. Instead, the encoded subsets of distributed bits for different layers may be directly modulated according to a PCS modulation scheme and scaled (e.g., by the one or more scaling values described above) to obtain different subsets of modulation symbols that may be mapped to one or more antenna ports of the transmitting device 800 and transmitted via different layers to a receiving device.

After receiving the different subsets of modulation symbols, the receiving device may perform a similar process for demodulating and decoding the subsets of modulation symbols as illustrated in FIGS. 7 and 8 except in reverse. For example, the different subsets of modulation symbols may be demodulated/descaled by the receiving device (e.g., based on the PCS modulation scheme), descrambled, de-rate matched, decoded, and distribution dematched. As such, to aid in the demodulating and decoding process, the receiving device may also receive or obtain the configuration for performing the PCS modulation scheme, indicating the set of parameters (e.g., rank, MCS index, DM rate/probability distribution, modulation order, spectral efficiency, etc.) that were are used for distribution matching, encoding, and modulating the different layers of the multi-layer transmission. Similarly, to ensure that the received subsets of modulation symbols are properly demodulated, the receiving device may determine the one or more scaling values applied to the subsets of modulation symbols in a similar manner as discussed above. In other cases, the receiving device may receive an indication of the one or more scaling values. In either case, the receiving device may remove the one or more scaling values from the subsets of modulation symbols.

Example Operations of a Transmitting Device

FIG. 9 shows a method 900 for wireless communications by a transmitting device. The transmitting device may comprise a network entity, such as the BS 102 of FIGS. 1 and 3 or a distributed BS as described with respect to FIG. 2. In some cases, the transmitting device may comprise a user equipment, such as the UE 104 of FIGS. 1 and 3.

Method 900 begins at 910 with obtaining a configuration for performing a PCS modulation scheme, the configuration indicating a set of parameters for different layers of a multi-layer transmission. In some cases, obtaining the configuration for performing the PCS modulation scheme comprises obtaining the configuration from a receiving device (e.g., a network entity, such as BS 102).

Method 900 then proceeds to step 920 with identifying a set of bits corresponding to a transport block for communication via the multi-layer transmission.

Method 900 then proceeds to step 930 with performing distribution matching on the set of bits using the set of parameters to obtain a set of distributed symbols.

Method 900 then proceeds to step 940 with converting the set of distributed symbols into a set of distributed bits.

Method 900 then proceeds to step 950 with encoding the set of distributed bits to obtain an encoded set of distributed bits;

Method 900 then proceeds to step 960 with performing a modulation procedure on the encoded set of distributed bits in accordance with the PCS modulation scheme to obtain a set of modulation symbols corresponding to a codeword associated with the transport block; and Method 900 then proceeds to step 960 with transmitting, to the receiving device, the codeword, including the set of modulation symbols, via the multi-layer transmission.

In some cases, method 900 further includes determining a respective DM rate for each layer of the multi-layer transmission based on the set of parameters.

In some cases, the set of parameters include at least: a transmission rank indicating a number of layers of the multi-layer transmission and a respective MCS index for each layer of the multi-layer transmission.

In some cases, determining the respective DM rate for each layer of the multi-layer transmission is based on a joint lookup table that maps the DM rate to: the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

In some cases, determining the respective DM rate for each layer of the multi-layer transmission is based on a probability distribution for that layer of the multi-layer transmission and a joint lookup table that maps the respective MCS index for that layer to: a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

In some cases, the set of parameters further include: a forward error correction (FEC) rate index for each layer of the multi-layer transmission, and a respective DM index for each layer of the multi-layer transmission.

In some cases, method 900 further includes determining an FEC rate based on the FEC rate index and a first lookup table, wherein determining the respective DM rate for each layer of the multi-layer transmission is based on the respective DM index for that layer and a second lookup table different from the first lookup table.

In some cases, the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

In some cases, the set of parameters include at least: a transmission rank indicating a number of layers of the multi-layer transmission, and a respective modulation and coding scheme (MCS) index for each layer of the multi-layer transmission.

In some cases, method 900 further comprises, for each layer of the multi-layer transmission: determining, based on the respective MCS index for that layer, a modulation order for that layer, and determining a respective probability distribution for that layer based on one of: the respective DM rate for that layer and the modulation order for that layer; or an explicit indication of the respective probability distribution for that layer included in the set of parameters.

In some cases, the set of bits comprise a plurality of subsets of bits, each subset of bits corresponding to a respective layer of the multi-layer transmission based on the DM rate and to the respective probability distribution for that respective layer.

In some cases, performing the distribution matching in step 930 comprises, for each subset of bits and corresponding respective layer of the multi-layer transmission, using a different distribution matching encoder to apply the respective probability distribution to that subset of bits to obtain a plurality of subsets of distributed symbols.

In some cases, converting the set of distributed symbols into the set of distributed bits in step 940 comprises: converting each subset of distributed symbols of the plurality of subsets of distributed symbols into a respective subset of distributed bits and combining each respective subset of distributed bits to obtain the set of distributed bits.

In some cases, encoding the set of distributed bits to obtain an encoded set of distributed bits in step 950 comprises jointly encoding each subset of distributed bits in the set of distributed bits using a common FEC code rate.

In some cases, method 900 further includes separating the encoded set of distributed bits into a plurality of subsets of encoded distributed bits, each subset of encoded distributed bits of the plurality of subsets of encoded distributed bits corresponding to a respective layer of the multi-layer transmission. In some cases, method 900 further includes for each subset of encoded distributed bits of the plurality of subsets of encoded distributed bits, mapping that subset of encoded distributed bits to the respective layer corresponding to that subset of encoded distributed bits based on the respective DM rate for the respective layer corresponding to that subset of encoded distributed bits.

In some cases, a size of each subset of encoded distributed symbols of the plurality of subsets of encoded distributed symbols is based on the respective DM rate for the respective layer corresponding to that subset of encoded distributed symbols.

In some cases, encoding the set of distributed bits to obtain the encoded set of distributed bits in step 950 comprises encoding each subset of distributed bits in the plurality of subsets of distributed symbols using a separate encoding process and using a common FEC code rate.

In some cases, each respective probability distribution indicates a set of probabilities, each probability of the set of probabilities associated with a different constellation point in a set of constellation points.

In some cases, determining one or more respective scaling values for each layer of the multi-layer transmission based on the respective probability distribution for that layer.

In some cases, performing the modulation procedure in step 960 further comprises, for each layer of the multi-layer transmission, applying the one or more respective scaling values to modulation symbols, in the set of modulation symbols, corresponding to that layer.

In some cases, transmitting the codeword in step 970, including the set of modulation symbols, comprises transmitting the set of modulation symbols using different layers of the multi-layer transmission.

Figure 11:
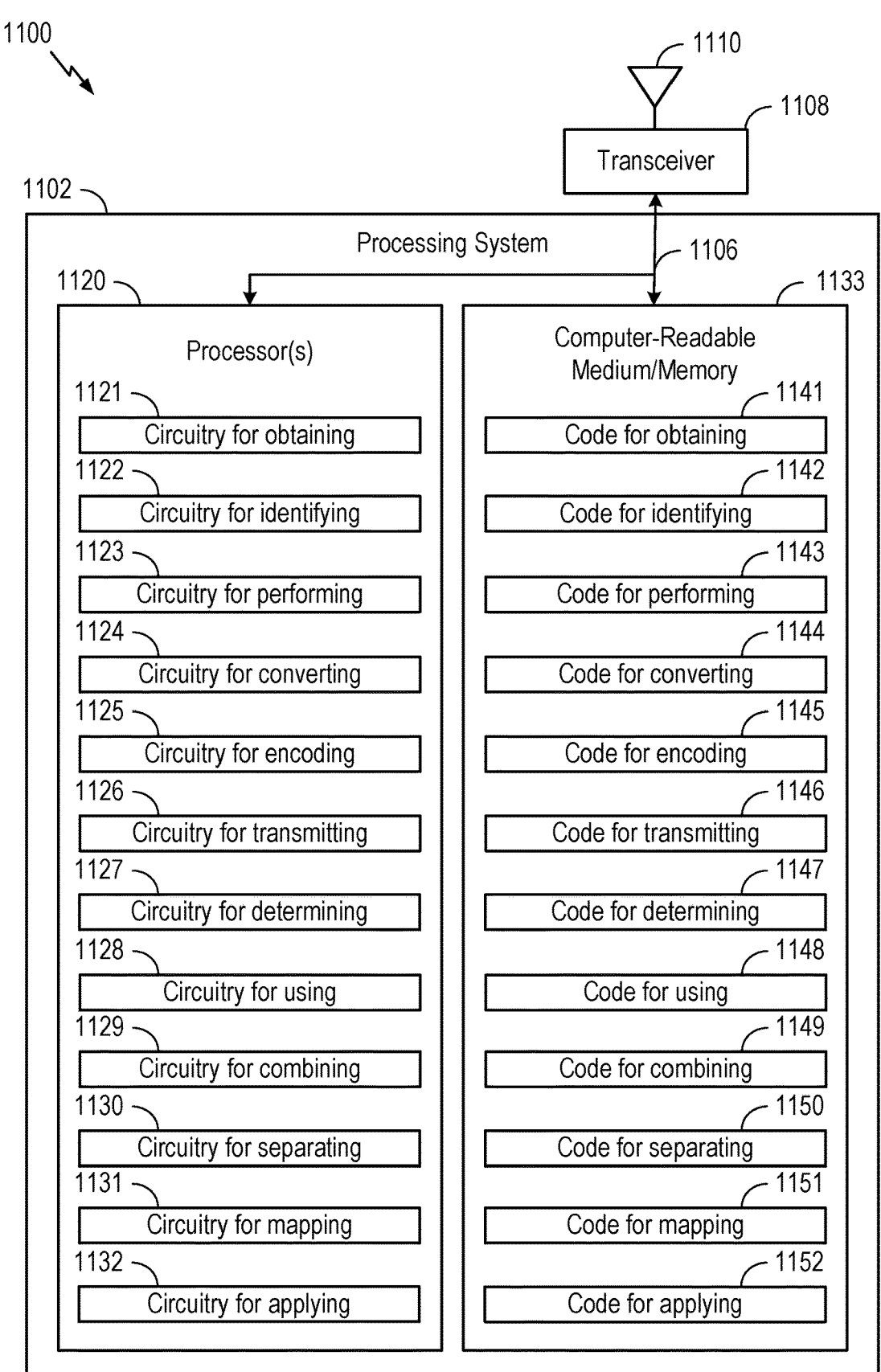
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Receiving Device

FIG. 10 shows a method 1000 for wireless communications by a receiving device. The receiving device may comprise a network entity, such as the BS 102 of FIGS. 1 and 3 or a distributed BS as described with respect to FIG. 2. In some cases, the receiving device may comprise a user equipment, such as the UE 104 of FIGS. 1 and 3.

Method 1000 begins at 1010 with obtaining a configuration for performing a probabilistic constellation shaping (PCS) modulation scheme, the configuration indicating a set of parameters for different layers of a multi-layer transmission.

Method 1000 then proceeds to step 1020 with receiving, from a transmitting device, a codeword associated with a transport block, including a set of modulation symbols, of a multi-layer transmission.

Method 1000 then proceeds to step 1030 with performing a demodulation procedure on the set of modulation symbols in accordance with the PCS modulation scheme to obtain an encoded set of distributed bits.

Method 1000 then proceeds to step 1040 with decoding the encoded set of distributed bits to obtain a set of distributed bits.

Method 1000 then proceeds to step 1050 with converting the set of distributed bits into a set of distributed symbols.

Method 1000 then proceeds to step 1060 with performing distribution dematching on the set of distributed symbols using the set of parameters to obtain a set of bits corresponding to the transport block of the multi-layer transmission.

In some cases, method 1000 further comprises determining a respective distribution matcher (DM) rate for each layer of the multi-layer transmission based on the set of parameters.

In some cases, the set of parameters include at least: a transmission rank indicating a number of layers of the multi-layer transmission, and a respective modulation and coding scheme (MCS) index for each layer of the multi-layer transmission.

In some cases, determining the respective DM rate for each layer of the multi-layer transmission is based on a joint lookup table that maps the DM rate to: the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

In some cases, determining the respective DM rate for each layer of the multi-layer transmission is based on a probability distribution for that layer of the multi-layer transmission and a joint lookup table that maps the respective MCS index for that layer to: a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

In some cases, the set of parameters further include: a forward error correction (FEC) rate index for each layer of the multi-layer transmission, and a respective DM index for each layer of the multi-layer transmission.

In some cases, the method 1000 further includes determining an FEC rate based on the FEC rate index and a first lookup table, wherein determining the respective DM rate for each layer of the multi-layer transmission is based on the respective DM index for that layer and a second lookup table different from the first lookup table.

In some cases, the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

In some cases, the set of parameters include at least: a transmission rank indicating a number of layers of the multi-layer transmission, and a respective modulation and coding scheme (MCS) index for each layer of the multi-layer transmission; and the method further comprises, for each layer of the multi-layer transmission: determining, based on the respective MCS index for that layer, a modulation order for that layer, and determining a respective probability distribution for that layer based on one of: the respective DM rate for that layer and the modulation order for that layer; or an explicit indication of the respective probability distribution for that layer included in the set of parameters.

In some cases, each respective probability distribution indicates a set of probabilities, each probability of the set of probabilities associated with a different constellation point in a set of constellation points.

In some cases, the method 1000 further includes determining one or more respective scaling values for each layer of the multi-layer transmission based on the respective probability distribution for that layer.

In some cases, the set of modulation symbols comprise a plurality of subsets of modulation symbols, each subset of modulation symbols of the plurality of subsets of modulation symbols corresponding to a different layer of the multi-layer transmission. In such cases, performing the demodulation procedure in step 1030 further comprises, for each layer of the multi-layer transmission, removing the one or more respective scaling values from modulation symbols in the subset of modulation symbols corresponding to that layer.

In some cases, the encoded set of distributed bits comprises a plurality of subsets of encoded distributed bits, each subset of encoded distributed bits of the plurality of subsets of encoded distributed bits corresponding to a different layer of the multi-layer transmission.

In some cases, decoding the encoded set of distributed bits to obtain a set of distributed bits in step 1040 comprises jointly decoding each subset of encoded distributed bits of the plurality of subsets of encoded distributed bits using a common FEC code rate.

In some cases, decoding the encoded set of distributed bits to obtain a set of distributed bits in step 1040 comprises decoding each subset of encoded distributed bits of the plurality of subsets of encoded distributed bits using a separate encoding process and using a common FEC code rate.

In some cases, the set of distributed bits comprises a plurality of subsets of distributed bits, each subset of distributed bits of the plurality of subsets of distributed bits corresponding to a different layer of the multi-layer transmission In some cases, converting the set of distributed bits into the set of distributed symbols in step 1050 comprises converting each subset of distributed bits of the plurality of subsets of distributed bits into a respective subset of distributed symbols of a plurality of subsets of distributed symbols.

In some cases, performing the distribution dematching in step 1060 comprises, for each respective subset of distributed symbols of the plurality of subsets of distributed symbols using a different distribution dematching decoder to remove the respective probability distribution from that respective subset of distributed symbols to obtain a plurality of subsets of distributed symbols to obtain the set of bits corresponding to the transport block of the multi-layer transmission In some cases, receiving the codeword in step 1020, including the set of modulation symbols, comprises receiving the set of modulation symbols using different layers of the multi-layer transmission.

Figure 12:
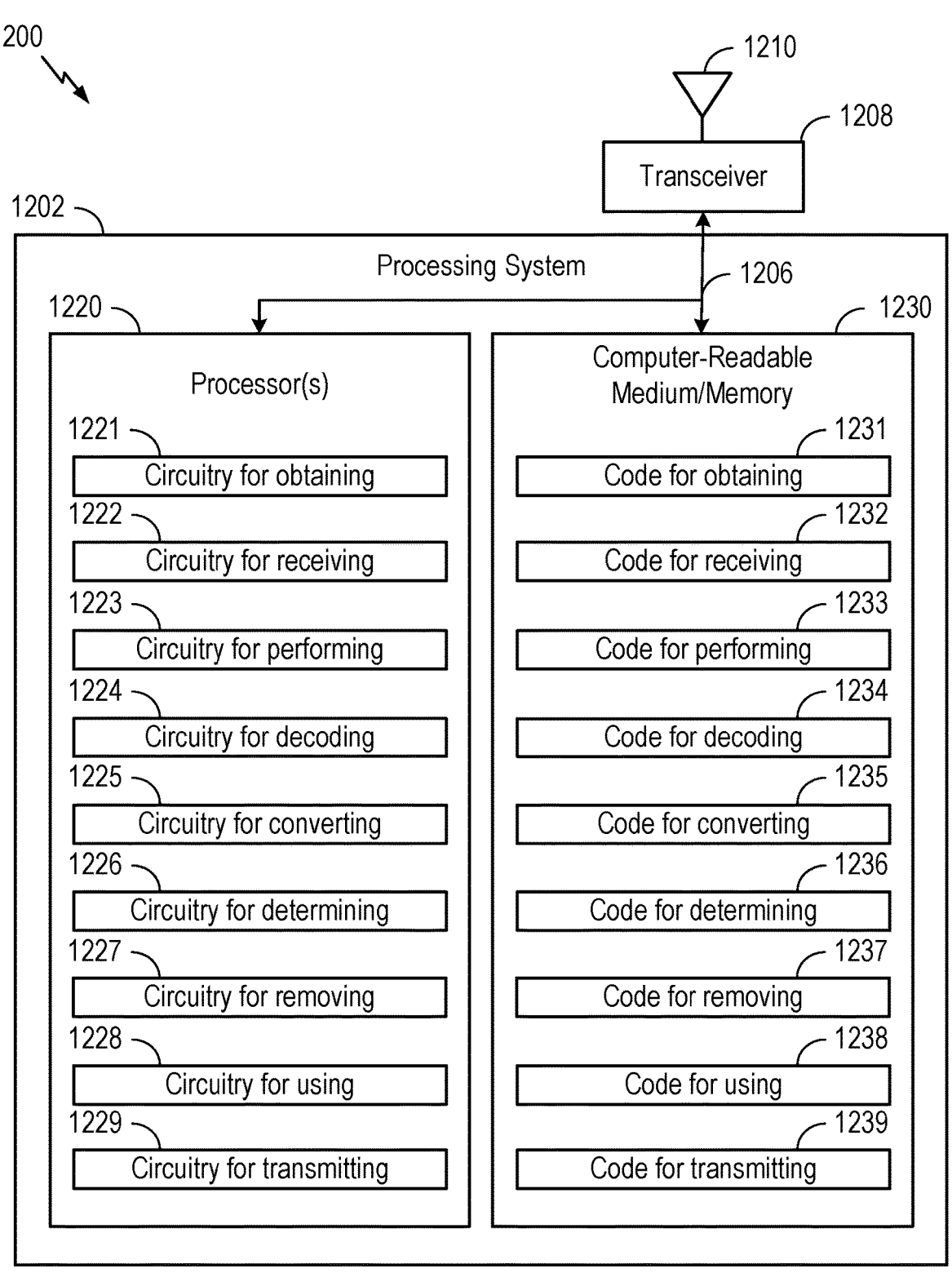
FIG. 12 depicts aspects of another example communications device.

In some cases, the method 1000 further includes transmitting, to the transmitting device, the configuration for performing the PCS modulation scheme In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.
Example Communications Devices FIG. 11 depicts aspects of an example communications device 1100. In some aspects, communications device 1100 is a user equipment, such as UE 104 described above with respect to FIGS. 1 and 3. In some aspects, communications device 1100 comprises a network entity, such as the BS 102 of FIGS. 1 and 3 or a distributed BS as described with respect to FIG. 2.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 358, transmit processor 364, TX MIMO processor 366, and/or controller/processor 380, as described with respect to FIG. 3. The one or more processors 1120 are coupled to a computer-readable medium/memory 1133 via a bus 1106. In certain aspects, the computer-readable medium/memory 1133 is configured to store instructions (e.g., computer-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

In the depicted example, computer-readable medium/memory 1133 stores code (e.g., executable instructions) for obtaining 1141, code for identifying 1142, code for performing 1143, code for converting 1144, code for encoding 1145, code for transmitting 1146, code for determining 1147, code for using 1148, code for combining 1149, code for separating 1150, code for mapping 1151, and code for applying 1152. Processing of the code 1141-1152 may cause the communications device 1100 to perform the method 900 described with respect to FIG. 9, or any aspect related to it.

The one or more processors 1120 include circuitry configured to implement (e.g., execute) the code stored in the computer-readable medium/memory 1133, including circuitry for obtaining 1121, circuitry for identifying 1122, circuitry for performing 1123, circuitry for converting 1124, circuitry for encoding 1125, circuitry for transmitting 1126, circuitry for determining 1127, circuitry for using 1128, circuitry for combining 1129, circuitry for separating 1130, circuitry for mapping 1131, and circuitry for applying 1132. Processing with circuitry 1121-1132 may cause the communications device 1100 to perform the method 900 described with respect to FIG. 9, or any aspect related to it.

Various components of the communications device 1100 may provide means for performing the method 900 described with respect to FIG. 9, or any aspect related to it. For example, means for transmitting, sending or outputting for transmission may include the transceivers 354 and/or antenna(s) 352 of the UE 104 illustrated in FIG. 3 and/or transceiver 1108 and antenna 1110 of the communications device 1100 in FIG. 11. Means for receiving or obtaining may include the transceivers 354 and/or antenna(s) 352 of the UE 104 illustrated in FIG. 3 and/or transceiver 1108 and antenna 1110 of the communications device 1100 in FIG. 11.

FIG. 12 depicts aspects of an example communications device. In some aspects, communications device 1200 is a network entity, such as BS 102 of FIGS. 1 and 3, or a disaggregated base station as discussed with respect to FIG. 2.

The communications device 1200 includes a processing system 1202 coupled to a transceiver 1208 (e.g., a transmitter and/or a receiver) and/or a network interface 1212. The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 2. The processing system 1202 may be configured to perform processing functions for the communications device 1200, including processing signals received and/or to be transmitted by the communications device 1200.

The processing system 1202 includes one or more processors 1220. In various aspects, one or more processors 1220 may be representative of one or more of receive processor 338, transmit processor 320, TX MIMO processor 330, and/or controller/processor 340, as described with respect to FIG. 3. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it. Note that reference to a processor of communications device 1200 performing a function may include one or more processors of communications device 1200 performing that function.

In the depicted example, the computer-readable medium/memory 1230 stores code (e.g., executable instructions) for obtaining 1231, code for receiving 1232, code for performing 1233, code for performing 1234, code for converting 1235, code for determining 1236, code for removing 1237, code for using 1238, and code for transmitting 1239. Processing of the code 1231-1239 may cause the communications device 1200 to perform the method 1000 described with respect to FIG. 10, or any aspect related to it.

The one or more processors 1220 include circuitry configured to implement (e.g., execute) the code stored in the computer-readable medium/memory 1230, including circuitry for obtaining 1221, circuitry for receiving 1222, circuitry for performing 1223, circuitry for performing 1224, circuitry for converting 1225, circuitry for determining 1226, circuitry for removing 1227, circuitry for using 1228, and circuitry for transmitting 1229. Processing with circuitry 1221-1229 may cause the communications device 1200 to perform the method 1000 as described with respect to FIG. 10, or any aspect related to it.

Various components of the communications device 1200 may provide means for performing the method 1000 as described with respect to FIG. 10, or any aspect related to it. Means for transmitting, sending or outputting for transmission may include the transceivers 332 and/or antenna(s) 334 of the BS 102 illustrated in FIG. 3 and/or transceiver 1208 and antenna 1210 of the communications device 1200 in FIG. 12. Means for receiving or obtaining may include the transceivers 332 and/or antenna(s) 334 of the BS 102 illustrated in FIG. 3 and/or transceiver 1208 and antenna 1210 of the communications device 1200 in FIG. 12.

Example Clauses

Implementation examples are described in the following numbered clauses:

Clause 1: A method for wireless communication by a transmitting device, comprising: receiving a configuration for performing a probabilistic constellation shaping (PCS) modulation scheme, the configuration indicating a set of parameters for different layers of a multi-layer transmission; identifying a set of bits corresponding to a transport block for communication via the multi-layer transmission; performing distribution matching on the set of bits using the set of parameters to obtain a set of distributed symbols; converting the set of distributed symbols into a set of distributed bits; encoding the set of distributed bits to obtain an encoded set of distributed bits; performing a modulation procedure on the encoded set of distributed bits in accordance with the PCS modulation scheme to obtain a set of modulation symbols corresponding to a codeword associated with the transport block; and transmitting the codeword, including the set of modulation symbols, via the multi-layer transmission.

Clause 2: The method of Clause 1, further comprising determining a respective distribution matcher (DM) rate for each layer of the multi-layer transmission based on the set of parameters.

Clause 3: The method of Clause 2, wherein the set of parameters include at least: a transmission rank indicating a number of layers of the multi-layer transmission, and a respective modulation and coding scheme (MCS) index for each layer of the multi-layer transmission.

Clause 4: The method of Clause 3, wherein determining the respective DM rate for each layer of the multi-layer transmission is based on a joint lookup table that maps the DM rate to: the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

Clause 5: The method of Clause 3, wherein determining the respective DM rate for each layer of the multi-layer transmission is based on a probability distribution for that layer of the multi-layer transmission and a joint lookup table that maps the respective MCS index for that layer to: a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

Clause 6: The method of Clause 2, wherein the set of parameters further include: a forward error correction (FEC) rate index for each layer of the multi-layer transmission, and a respective DM index for each layer of the multi-layer transmission.

Clause 7: The method of Clause 6, further comprising determining an FEC rate based on the FEC rate index and a first lookup table, wherein determining the respective DM rate for each layer of the multi-layer transmission is based on the respective DM index for that layer and a second lookup table different from the first lookup table.

Clause 8: The method of Clause 7, wherein: the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

Clause 9: The method of any one of Clauses 2-8, wherein: the set of parameters include at least: a transmission rank indicating a number of layers of the multi-layer transmission, and a respective modulation and coding scheme (MCS) index for each layer of the multi-layer transmission; and the method further comprises, for each layer of the multi-layer transmission: determining, based on the respective MCS index for that layer, a modulation order for that layer, and determining a respective probability distribution for that layer based on one of: the respective DM rate for that layer and the modulation order for that layer; or an explicit indication of the respective probability distribution for that layer included in the set of parameters.

Clause 10: The method of Clause 9, wherein the set of bits comprise a plurality of subsets of bits, each subset of bits corresponding to a respective layer of the multi-layer transmission based on the DM rate and to the respective probability distribution for that respective layer.

Clause 11: The method of Clause 10, wherein performing the distribution matching comprises, for each subset of bits and corresponding respective layer of the multi-layer transmission, using a different distribution matching encoder to apply the respective probability distribution to that subset of bits to obtain a plurality of subsets of distributed symbols.

Clause 12: The method of Clause 11, wherein converting the set of distributed symbols into the set of distributed bits comprises: converting each subset of distributed symbols of the plurality of subsets of distributed symbols into a respective subset of distributed bits; and combining each respective subset of distributed bits to obtain the set of distributed bits.

Clause 13: The method of Clause 12, wherein encoding the set of distributed bits to obtain an encoded set of distributed bits comprises jointly encoding each subset of distributed bits in the set of distributed bits using a common forward error correction (FEC) code rate.

Clause 14: The method of Clause 13, further comprising: separating the encoded set of distributed bits into a plurality of subsets of encoded distributed bits, each subset of encoded distributed bits of the plurality of subsets of encoded distributed bits corresponding to a respective layer of the multi-layer transmission; and for each subset of encoded distributed bits of the plurality of subsets of encoded distributed bits, mapping that subset of encoded distributed bits to the respective layer corresponding to that subset of encoded distributed bits based on the respective DM rate for the respective layer corresponding to that subset of encoded distributed bits.

Clause 15: The method of Clause 14, wherein a size of each subset of encoded distributed symbols of the plurality of subsets of encoded distributed symbols is based on the respective DM rate for the respective layer corresponding to that subset of encoded distributed symbols.

Clause 16: The method of Clause 11, wherein encoding the set of distributed bits to obtain the encoded set of distributed bits comprises encoding each subset of distributed bits in the plurality of subsets of distributed symbols using a separate encoding process and using a common forward error correction (FEC) code rate.

Clause 17: The method of any one of Clauses 9-16, wherein each respective probability distribution indicates a set of probabilities, each probability of the set of probabilities associated with a different constellation point in a set of constellation points.

Clause 18: The method of Clause 17, further comprising determining one or more respective scaling values for each layer of the multi-layer transmission based on the respective probability distribution for that layer.

Clause 19: The method of Clause 18, wherein performing the modulation procedure further comprises, for each layer of the multi-layer transmission, applying the one or more respective scaling values to modulation symbols, in the set of modulation symbols, corresponding to that layer.

Clause 20: The method of any one of Clauses 1-19, wherein transmitting the codeword, including the set of modulation symbols, comprises transmitting the set of modulation symbols using different layers of the multi-layer transmission.

Clause 21: The method of any one of Clauses 1-20, wherein obtaining the configuration for performing the PCS modulation scheme comprises receiving the configuration from the receiving device.

Clause 22: A method for wireless communication by a transmitting device, comprising: transmitting a configuration for performing a probabilistic constellation shaping (PCS) modulation scheme, the configuration indicating a set of parameters for different layers of a multi-layer transmission; receiving a codeword associated with a transport block, including a set of modulation symbols, of a multi-layer transmission; performing a demodulation procedure on the set of modulation symbols in accordance with the PCS modulation scheme to obtain an encoded set of distributed bits; decoding the encoded set of distributed bits to obtain a set of distributed bits; converting the set of distributed bits into a set of distributed symbols; and performing distribution dematching on the set of distributed symbols using the set of parameters to obtain a set of bits corresponding to the transport block of the multi-layer transmission.

Clause 23: The method of Clause 22, further comprising determining a respective distribution matcher (DM) rate for each layer of the multi-layer transmission based on the set of parameters.

Clause 24: The method of Clause 23, wherein the set of parameters include at least: a transmission rank indicating a number of layers of the multi-layer transmission, and a respective modulation and coding scheme (MCS) index for each layer of the multi-layer transmission.

Clause 25: The method of Clause 24, wherein determining the respective DM rate for each layer of the multi-layer transmission is based on a joint lookup table that maps the DM rate to: the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

Clause 26: The method of Clause 24, wherein determining the respective DM rate for each layer of the multi-layer transmission is based on a probability distribution for that layer of the multi-layer transmission and a joint lookup table that maps the respective MCS index for that layer to: a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

Clause 27: The method of Clause 23, wherein the set of parameters further include: a forward error correction (FEC) rate index for each layer of the multi-layer transmission, and a respective DM index for each layer of the multi-layer transmission.

Clause 28: The method of Clause 27, further comprising determining an FEC rate based on the FEC rate index and a first lookup table, wherein determining the respective DM rate for each layer of the multi-layer transmission is based on the respective DM index for that layer and a second lookup table different from the first lookup table.

Clause 29: The method of Clause 28, wherein: the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

Clause 30: The method of any one of Clauses 23-29, wherein: the set of parameters include at least: a transmission rank indicating a number of layers of the multi-layer transmission, and a respective modulation and coding scheme (MCS) index for each layer of the multi-layer transmission; and the method further comprises, for each layer of the multi-layer transmission: determining, based on the respective MCS index for that layer, a modulation order for that layer, and determining a respective probability distribution for that layer based on one of: the respective DM rate for that layer and the modulation order for that layer; or an explicit indication of the respective probability distribution for that layer included in the set of parameters.

Clause 31: The method of Clause 30, wherein each respective probability distribution indicates a set of probabilities, each probability of the set of probabilities associated with a different constellation point in a set of constellation points.

Clause 32: The method of Clause 31, further comprising determining one or more respective scaling values for each layer of the multi-layer transmission based on the respective probability distribution for that layer.

Clause 33: The method of Clause 32, wherein: the set of modulation symbols comprise a plurality of subsets of modulation symbols, each subset of modulation symbols of the plurality of subsets of modulation symbols corresponding to a different layer of the multi-layer transmission, and performing the demodulation procedure further comprises, for each layer of the multi-layer transmission, removing the one or more respective scaling values from modulation symbols in the subset of modulation symbols corresponding to that layer.

Clause 34: The method of any one of Clauses 30-33, wherein the encoded set of distributed bits comprises a plurality of subsets of encoded distributed bits, each subset of encoded distributed bits of the plurality of subsets of encoded distributed bits corresponding to a different layer of the multi-layer transmission.

Clause 35: The method of Clause 34, wherein decoding the encoded set of distributed bits to obtain a set of distributed bits comprises jointly decoding each subset of encoded distributed bits of the plurality of subsets of encoded distributed bits using a common forward error correction (FEC) code rate.

Clause 36: The method of Clause 34, wherein decoding the encoded set of distributed bits to obtain a set of distributed bits comprises decoding each subset of encoded distributed bits of the plurality of subsets of encoded distributed bits using a separate encoding process and using a common forward error correction (FEC) code rate.

Clause 37: The method of any one of Clauses 30-36, wherein the set of distributed bits comprises a plurality of subsets of distributed bits, each subset of distributed bits of the plurality of subsets of distributed bits corresponding to a different layer of the multi-layer transmission.

Clause 38: The method of Clause 37, wherein converting the set of distributed bits into the set of distributed symbols comprises converting each subset of distributed bits of the plurality of subsets of distributed bits into a respective subset of distributed symbols of a plurality of subsets of distributed symbols.

Clause 39: The method of Clause 38, wherein performing the distribution dematching comprises, for each respective subset of distributed symbols of the plurality of subsets of distributed symbols using a different distribution dematching decoder to remove the respective probability distribution from that respective subset of distributed symbols to obtain a plurality of subsets of distributed symbols to obtain the set of bits corresponding to the transport block of the multi-layer transmission.

Clause 40: The method of any one of Clauses 22-39, wherein receiving the codeword, including the set of modulation symbols, comprises receiving the set of modulation symbols using different layers of the multi-layer transmission.

Clause 41: The method of any one of Clauses 22-40, further comprising transmitting, to the transmitting device, the configuration for performing the PCS modulation scheme Clause 42: An apparatus, comprising: a memory comprising executable instructions; and a processor configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by a processor of an apparatus, cause the apparatus to perform a method in accordance with any one of Clauses 1-41.

Clause 45: A computer program product embodied on a computer-readable storage medium comprising code for performing a method in accordance with any one of Clauses 1-41.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a transmitting device, comprising:

obtaining a configuration for performing a probabilistic constellation shaping (PCS) modulation scheme, the configuration indicating a set of parameters for different layers of a multi-layer transmission;

identifying a set of bits corresponding to a transport block for communication via the multi-layer transmission;

performing distribution matching on the set of bits using the set of parameters to obtain a set of distributed symbols, wherein a respective distribution matcher (DM) rate for each layer of the multi-layer transmission is determined based on the set of parameters;

converting the set of distributed symbols into a set of distributed bits;

encoding the set of distributed bits to obtain an encoded set of distributed bits;

performing a modulation procedure on the encoded set of distributed bits in accordance with the PCS modulation scheme to obtain a set of modulation symbols corresponding to a codeword associated with the transport block; and transmitting, to a receiving device, the codeword, including the set of modulation symbols, via the multi-layer transmission.

2. The method of claim 1, wherein the set of parameters include at least:

a transmission rank indicating a number of layers of the multi-layer transmission, and a respective modulation and coding scheme (MCS) index for each layer of the multi-layer transmission.

3. The method of claim 2, wherein determining the respective DM rate for each layer of the multi-layer transmission is based on a joint lookup table that maps the DM rate to:

the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

4. The method of claim 2, wherein determining the respective DM rate for each layer of the multi-layer transmission is based on a probability distribution for that layer of the multi-layer transmission and a joint lookup table that maps the respective MCS index for that layer to:

a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

5. The method of claim 1, wherein the set of parameters further include:

a forward error correction (FEC) rate index for each layer of the multi-layer transmission, and a respective DM index for each layer of the multi-layer transmission.

6. The method of claim 5, further comprising determining an FEC rate based on the FEC rate index and a first lookup table, wherein determining the respective DM rate for each layer of the multi-layer transmission is based on the respective DM index for that layer and a second lookup table different from the first lookup table.

7. The method of claim 6, wherein:

the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

8. The method of claim 1, wherein:

the set of parameters include at least:

a transmission rank indicating a number of layers of the multi-layer transmission, and a respective modulation and coding scheme (MCS) index for each layer of the multi-layer transmission; and the method further comprises, for each layer of the multi-layer transmission:

determining, based on the respective MCS index for that layer, a modulation order for that layer, and determining a respective probability distribution for that layer based on one of:

the respective DM rate for that layer and the modulation order for that layer; or an explicit indication of the respective probability distribution for that layer included in the set of parameters.

9. The method of claim 8, wherein the set of bits comprise a plurality of subsets of bits, each subset of bits corresponding to a respective layer of the multi-layer transmission based on the DM rate and to the respective probability distribution for that respective layer.

10. The method of claim 9, wherein performing the distribution matching comprises, for each subset of bits and corresponding respective layer of the multi-layer transmission, using a different distribution matching encoder to apply the respective probability distribution to that subset of bits to obtain a plurality of subsets of distributed symbols.

11. The method of claim 10, wherein:

converting the set of distributed symbols into the set of distributed bits comprises converting each subset of distributed symbols of the plurality of subsets of distributed symbols into a respective subset of distributed bits; and combining each respective subset of distributed bits to obtain the set of distributed bits.

12. The method of claim 11, wherein encoding the set of distributed bits to obtain an encoded set of distributed bits comprises jointly encoding each subset of distributed bits in the set of distributed bits using a common forward error correction (FEC) code rate.

13. The method of claim 12, further comprising:

separating the encoded set of distributed bits into a plurality of subsets of encoded distributed bits, each subset of encoded distributed bits of the plurality of subsets of encoded distributed bits corresponding to a respective layer of the multi-layer transmission; and for each subset of encoded distributed bits of the plurality of subsets of encoded distributed bits, mapping that subset of encoded distributed bits to the respective layer corresponding to that subset of encoded distributed bits based on the respective DM rate for the respective layer corresponding to that subset of encoded distributed bits.

14. The method of claim 13, wherein a size of each subset of encoded distributed symbols of the plurality of subsets of encoded distributed symbols is based on the respective DM rate for the respective layer corresponding to that subset of encoded distributed symbols.

15. The method of claim 10, wherein encoding the set of distributed bits to obtain the encoded set of distributed bits comprises encoding each subset of distributed bits in the plurality of subsets of distributed symbols using a separate encoding process and using a common forward error correction (FEC) code rate.

16. The method of claim 8, wherein each respective probability distribution indicates a set of probabilities, each probability of the set of probabilities associated with a different constellation point in a set of constellation points.

17. The method of claim 16, further comprising determining one or more respective scaling values for each layer of the multi-layer transmission based on the respective probability distribution for that layer.

18. The method of claim 17, wherein performing the modulation procedure further comprises, for each layer of the multi-layer transmission, applying the one or more respective scaling values to modulation symbols, in the set of modulation symbols, corresponding to that layer.

19. The method of claim 1, wherein transmitting the codeword, including the set of modulation symbols, comprises transmitting the set of modulation symbols using different layers of the multi-layer transmission.

20. The method of claim 1, wherein obtaining the configuration for performing the PCS modulation scheme comprises receiving the configuration from the receiving device.

21. A transmitting device, comprising:

a memory comprising executable instructions; and a processor configured to execute the executable instructions and cause the transmitting device to:

obtain a configuration for performing a probabilistic constellation shaping (PCS) modulation scheme, the configuration indicating a set of parameters for different layers of a multi-layer transmission;

identify a set of bits corresponding to a transport block for communication via the multi-layer transmission;

perform distribution matching on the set of bits using the set of parameters to obtain a set of distributed symbols, wherein a respective distribution matcher (DM) rate for each layer of the multi-layer transmission is determined based on the set of parameters;

convert the set of distributed symbols into a set of distributed bits;

encode the set of distributed bits to obtain an encoded set of distributed bits;

perform a modulation procedure on the encoded set of distributed bits in accordance with the PCS modulation scheme to obtain a set of modulation symbols corresponding to a codeword associated with the transport block; and transmit, to a receiving device, the codeword, including the set of modulation symbols, via the multi-layer transmission.

22. The transmitting device of claim 21, wherein the set of parameters include at least:

a transmission rank indicating a number of layers of the multi-layer transmission, and a respective modulation and coding scheme (MCS) index for each layer of the multi-layer transmission.

23. The transmitting device of claim 22, wherein the processor is further configured to cause the transmitting device to determine the respective DM rate for each layer of the multi-layer transmission based on a joint lookup table that maps the DM rate to:

the respective MCS index for that layer of the multi-layer transmission, a modulation order for that layer of the multi-layer transmission, a forward error correction (FEC) encoding rate for that layer of the multi-layer transmission, and a spectral efficiency for that layer of the multi-layer transmission.

24. The transmitting device of claim 22, wherein the processor is further configured to cause the transmitting device to determine the respective DM rate for each layer of the multi-layer transmission is based on a probability distribution for that layer of the multi-layer transmission and a joint lookup table that maps the respective MCS index for that layer to:

a modulation order for that layer of the multi-layer transmission, a forward error correction (FEC) encoding rate for that layer of the multi-layer transmission, the probability distribution for that layer of the multi-layer transmission, and a spectral efficiency for that layer of the multi-layer transmission.

25. The transmitting device of claim 21, wherein the set of parameters further include:

a forward error correction (FEC) rate index for each layer of the multi-layer transmission, and a respective DM index for each layer of the multi-layer transmission.

26. The transmitting device of claim 25, wherein the processor is further configured to cause the transmitting device to determine an FEC rate based on the FEC rate index and a first lookup table, wherein determining the respective DM rate for each layer of the multi-layer transmission is based on the respective DM index for that layer and a second lookup table different from the first lookup table, wherein:

the first lookup table maps the FEC rate index to a modulation order for each layer of the multi-layer transmission and the FEC rate, and the second lookup table maps, for each layer of the multi-layer transmission, the respective DM rate index to a modulation order for that layer and the respective DM rate for that layer.

27. A transmitting device, comprising:

means for obtaining a configuration for performing a probabilistic constellation shaping (PCS) modulation scheme, the configuration indicating a set of parameters for different layers of a multi-layer transmission;

means for identifying a set of bits corresponding to a transport block for communication via the multi-layer transmission;

means for performing distribution matching on the set of bits using the set of parameters to obtain a set of distributed symbols, wherein a respective distribution matcher (DM) rate for each layer of the multi-layer transmission is determined based on the set of parameters;

means for converting the set of distributed symbols into a set of distributed bits;

means for encoding the set of distributed bits to obtain an encoded set of distributed bits;

means for performing a modulation procedure on the encoded set of distributed bits in accordance with the PCS modulation scheme to obtain a set of modulation symbols corresponding to a codeword associated with the transport block; and means for transmitting, to a receiving device, the codeword, including the set of modulation symbols, via the multi-layer transmission.

28. A non-transitory computer-readable medium, comprising:

executable instructions that, when executed by a processor of a transmitting device, cause the transmitting device to:

obtain a configuration for performing a probabilistic constellation shaping (PCS) modulation scheme, the configuration indicating a set of parameters for different layers of a multi-layer transmission;

identify a set of bits corresponding to a transport block for communication via the multi-layer transmission;

perform distribution matching on the set of bits using the set of parameters to obtain a set of distributed symbols, wherein a respective distribution matcher (DM) rate for each layer of the multi-layer transmission is determined based on the set of parameters;

convert the set of distributed symbols into a set of distributed bits;

encode the set of distributed bits to obtain an encoded set of distributed bits;

perform a modulation procedure on the encoded set of distributed bits in accordance with the PCS modulation scheme to obtain a set of modulation symbols corresponding to a codeword associated with the transport block; and transmit, to a receiving device, the codeword, including the set of modulation symbols, via the multi-layer transmission.

\* \* \* \* \*